(12) United States Patent
Kawai et al.

(10) Patent No.: US 9,179,059 B2
(45) Date of Patent: Nov. 3, 2015

(54) IMAGE CAPTURE DEVICE AND IMAGE DISPLAY METHOD

(71) Applicant: FUJIFILM Corporation, Tokyo (JP)

(72) Inventors: Tomoyuki Kawai, Saitama (JP); Katsutoshi Izawa, Saitama (JP); Junji Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/546,366

(22) Filed: Nov. 18, 2014

(65) Prior Publication Data

US 2015/0070539 A1  Mar. 12, 2015

Related U.S. Application Data

(63) Continuation of application No. PCT/JP2013/063404, filed on May 14, 2013.

(30) Foreign Application Priority Data

Jun. 7, 2012  (JP) .................. 2012-130109

(51) Int. Cl.
*H04N 5/232* (2006.01)
*H04N 5/335* (2011.01)
(Continued)

(52) U.S. Cl.
CPC .............. *H04N 5/23212* (2013.01); *G02B 7/34* (2013.01); *G03B 13/18* (2013.01); *G03B 17/18* (2013.01); *H04N 5/23293* (2013.01); *H04N 9/045* (2013.01); *H04N 5/3696* (2013.01)

(58) Field of Classification Search
CPC ............ H04N 5/23212; H04N 5/3696; H04N 5/23293; G02B 7/34; G03B 13/36
USPC ......... 348/345–356, 333.11, 294; 396/63–70, 396/121
See application file for complete search history.

(56) References Cited

U.S. PATENT DOCUMENTS

2006/0251413 A1  11/2006 Toji
2009/0115882 A1*  5/2009 Kawarada ..................... 348/340
(Continued)

FOREIGN PATENT DOCUMENTS

JP  2001-309210 A  11/2001
JP  2004-40740 A  2/2004
(Continued)

OTHER PUBLICATIONS

International Preliminary Report on Patentability, dated Jan. 22, 2014, issued in PCT/JP2013/063404.
(Continued)

*Primary Examiner* — Sinh Tran
*Assistant Examiner* — Xi Wang
(74) *Attorney, Agent, or Firm* — Birch, Stewart, Kolasch & Birch, LLP

(57) ABSTRACT

An image capture element includes phase difference pixel groups (first and second pixel groups) corresponding to first and second images with a phase difference according to a focus shift, includes a third pixel group corresponding to a normal third image, outputs a first image and a second image with Bayer arrays from the first and second pixel groups, and outputs a third image with the same color array as a RAW image from the third pixel group. A color split image is generated based on the first and second images acquired from the image capture element, a color image for display is generated based on the third image, and the color split image is synthesized with part of the generated color image for display to thereby display a live-view image in which the split image is synthesized.

12 Claims, 18 Drawing Sheets

(51) Int. Cl.

| | |
|---|---|
| *H04N 5/222* | (2006.01) |
| *G03B 3/10* | (2006.01) |
| *G02B 7/34* | (2006.01) |
| *H04N 9/04* | (2006.01) |
| *G03B 13/18* | (2006.01) |
| *G03B 17/18* | (2006.01) |
| *H04N 5/369* | (2011.01) |

(56) References Cited

U.S. PATENT DOCUMENTS

| | | |
|---|---|---|
| 2009/0153693 A1 | 6/2009 | Onuki et al. |
| 2009/0278966 A1* | 11/2009 | Kusaka .................. 348/294 |
| 2010/0091161 A1 | 4/2010 | Suzuki |
| 2011/0102663 A1* | 5/2011 | Ichimiya ................ 348/345 |
| 2012/0092545 A1* | 4/2012 | Sugawara ............... 348/345 |

FOREIGN PATENT DOCUMENTS

| | | |
|---|---|---|
| JP | 2008-312073 A | 12/2008 |
| JP | 2009-147665 A | 7/2009 |
| JP | 2009-237214 A | 10/2009 |
| JP | 2009-276426 A | 11/2009 |

OTHER PUBLICATIONS

International Search Report, mailed Jul. 16, 2013, issued in PCT/JP2013/063404.

Written Opinion of the International Searching Authority, mailed Jul. 16, 2013, issued in PCT/JP2013/063404.

* cited by examiner

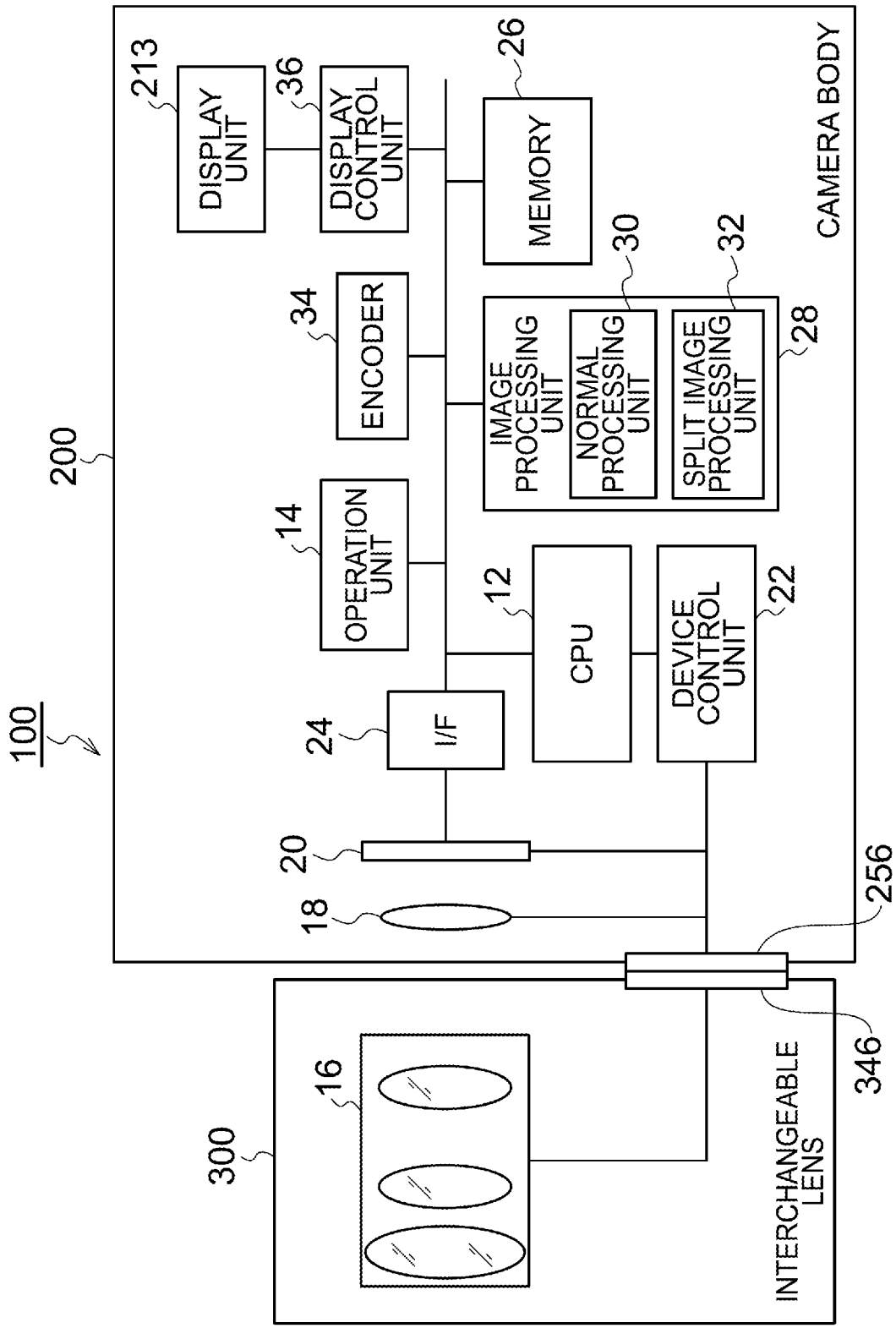

(SURFACE A)

(SURFACE B)

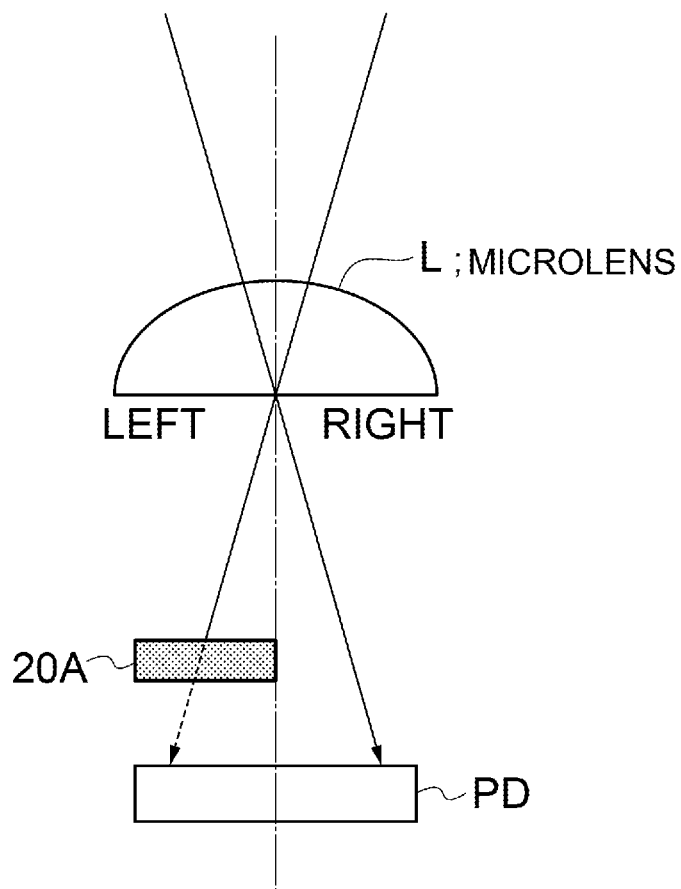
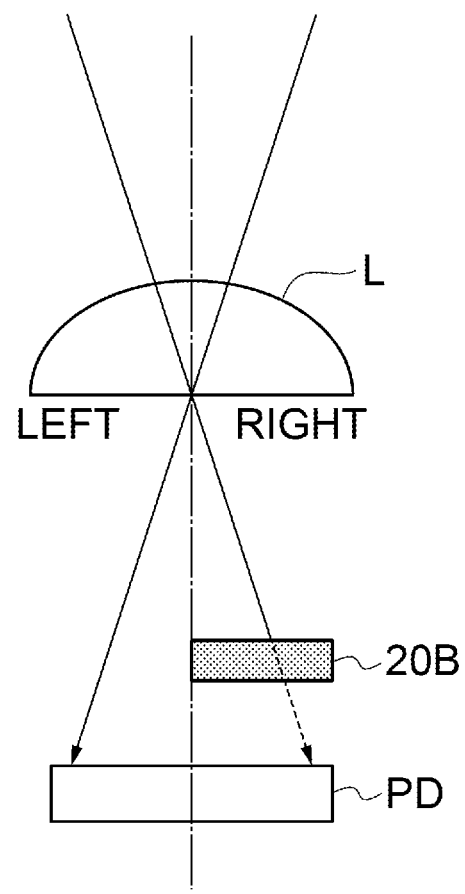
FIG.5A
FIG.5B

IMAGE CAPTURE DEVICE AND IMAGE DISPLAY METHOD

CROSS-REFERENCE TO RELATED APPLICATIONS

This application is a Continuation of PCT International Application No. PCT/JP2013/063404 filed on May 14, 2013, which claims priority under 35 U.S.C §119(a) to Japanese Patent Application No. 2012-130109 filed on Jun. 7, 2012. Each of the above application(s) is hereby expressly incorporated by reference, in its entirety, into the present application.

BACKGROUND OF THE INVENTION

1. Field of the Invention

The present invention relates to an image capture device and an image display method, and particularly, to a technique of displaying a split image for manual focus.

2. Description of the Related Art

A digital camera is well known that includes a so-called manual focus mode allowing the user to manually perform focus adjustment, in addition to auto focus using a phase difference detection system or a contrast detection system.

A digital camera is well known that includes the manual focus mode, the digital camera adopting a method of using a split microprism screen for displaying a phase difference by visual observation by providing a reflex mirror to allow focus adjustment while checking an imaged object or adopting a method of checking the contrast by visual observation.

By the way, a digital camera without a reflex mirror that is widely used in recent years does not include a method of checking an object image while displaying the phase difference because there is no reflex mirror. Therefore, the user needs to depend on the contrast detection system. However, the contrast greater than the resolution of a display device, such as an LCD (Liquid Crystal Display), cannot be displayed in this case, and a method of displaying the contrast by partial enlargement or the like needs to be adopted.

Consequently, a split image is displayed in a live-view image (also called through image) in recent years to facilitate operation of focusing the object by the operator in the manual focus mode. Here, the split image denotes an image in which divided upper and lower images shift in a left-right direction according to the shift of the focus, and the shift of the upper and lower images in the left-right direction is eliminated in a focused state. The operator operates a manual focus ring to adjust the focus in order to eliminate the shift of the upper and lower images of the split image.

A manual focus device described in PTL 1 (Japanese Patent Application Laid-Open No. 2004-40740) includes an aperture diaphragm that can shift and move to the left and right on an object light path, creates a split image from an image when the aperture diaphragm is shifted to the right and from an image when the aperture diaphragm is shifted to the left, and displays the split image on a monitor.

Further, an image capture device described in PTL 2 (Japanese Patent Application Laid-Open No. 2009-147665) generates a first image and a second image obtained by photoelectrically converting a first object image and a second object image, respectively, formed by luminous fluxes divided by a pupil division unit among the luminous fluxes from an image capture optical system and uses the first and second images to generate a split image. Furthermore, a third object image formed by a luminous flux not divided by the pupil division unit is photoelectrically converted to generate a third image. Then, the third image is displayed on a display unit, the generated split image is displayed in the third image, and color information extracted from the third image is added to the split image.

A digital camera described in PTL 3 (Japanese Patent Application Laid-Open No. 2001-309210) includes a distance measurement unit of a phase difference detection system, obtains a shift amount according to the distance to an object measured by the distance measurement unit, and displays a split image shifted in left and right opposite directions according to the shift amount in a live-view image.

SUMMARY OF THE INVENTION

However, the manual focus device described in PTL 1 requires a mechanical configuration for moving the diaphragm, and there are problems such as reservation of a space for housing the configuration and increase in the number of components. Further, in the image capture device described in PTL 2, the color information does not include pupil-divided phase information, and there is a problem that the luminance and the color of the split image are shifted.

The digital camera described in PTL 3 does not have a configuration for pupil-dividing and imaging the object light, and it is difficult to realize an accurate split image without a failure.

The present invention has been made in view of the circumstances, and an object of the present invention is to provide an image capture device and an image display method that can perform focus adjustment while viewing a focusing confirmation image during manual focus and that can particularly display a color focusing confirmation image without a color shift.

To attain the object, an aspect of the present invention provides an image capture device including: an image capture element provided with color filters including a predetermined color filter array on pixels arranged in a matrix, the image capture element outputting a first color image with the same color array as the color array of the color filters, the image capture element including first and second pixel groups formed by pupil-dividing an object image passed through different first and second areas of an imaging lens, respectively, the image capture element including a third pixel group formed without pupil-dividing the object image, the image capture element outputting, from the first and second pixel groups, a first image and a second image with the same color array as the first color image or Bayer array, the image capture element outputting, from the third pixel group, a third image with the same color array as the first color image; a display unit that displays a color live-view image; a focusing confirmation image generation unit (split image processing unit) that generates a color focusing confirmation image based on the first image and the second image acquired from the image capture element; an image processing unit (normal processing unit) that generates a second color image for display to be displayed on the display unit based on the third image acquired from the image capture element; and a display control unit that displays the color focusing confirmation image generated by the focusing confirmation image generation unit in a display area of the second color image for display generated by the image processing unit.

According to the aspect of the present invention, the image capture element provided with the color filters including the predetermined color filter array on the pixels arranged in a matrix is used, the image capture element outputting the first color image with the same color array as the color array of the color filters, the image capture element including the first and second pixel groups formed by pupil-dividing the object image passed through the different first and second areas of the imaging lens, respectively, the image capture element including the third pixel group formed without pupil-dividing the object image, the image capture element outputting, from the first and second pixel groups, the first image and the second image with the same color array as the first color image or Bayer array, the image capture element outputting, from the third pixel group, the third image with the same color array as the first color image. Then, the color focusing confirmation image generated from the first and second images is displayed in the display area of the second color image for display generated from the third image, and this allows performing focus adjustment while viewing the color focusing confirmation image without a color shift during manual focus. Further, the image capture element can output the first and second images with the same color array as in the first color image or Bayer array. Therefore, the focusing confirmation image can be generated by image processing similar to that in the third image or the same image processing as in a general Bayer array.

It is preferable that in the image capture device according to another aspect of the present invention, the focusing confirmation image generated by the focusing confirmation image generation unit includes divided images corresponding to the first and second images and is a split image in which the divided images are shifted according to a focus state.

In the image capture device according to yet another aspect of the present invention, the imaging lens is an interchangeable lens that can be attached to and detached from an image capture device body or is an integrated lens fixed to the device body, and the image capture device further includes a manual operation unit that adjusts a defocus amount of the imaging lens by manual operation. Even if an interchangeable lens that cannot communicate with the device body is mounted, the manual focus can be performed by using the focusing confirmation image and operating the manual operation unit.

It is preferable that in the image capture device according to yet another aspect of the present invention, the image processing unit includes a generation unit that generates a pixel group not pupil-divided according to the first and second pixel groups based on the third pixel group and generates a third color image for recording made of an image of all pixels of one screen that is not pupil-divided, the image capture device further includes a recording unit that records the third color image for recording, the focusing confirmation image generation unit executes a process in parallel with a process of the image processing unit, and the display control unit synthesizes the second color image for display and the focusing confirmation image that are output at the same time from the image processing unit and the focusing confirmation image generation unit to display the images on the display unit.

During recording, a normal color image (color moving image or still image) can be recorded, and an image for manual focus including the focusing confirmation image can be displayed for the live-view image for display (live-view image during moving image recording or live-view image before taking still image). This can assist focusing.

In the image capture device according to yet another aspect of the present invention, it is preferable to further include a phase difference detection unit (central processing unit) that detects a phase difference between the first image and the second image output from the image capture element, wherein in the focusing confirmation image generated by the focusing confirmation image generation unit, the display control unit uses the second color image for display generated by the image processing unit for a part in which the phase difference detected by the phase difference detection unit is smaller than a predetermined threshold.

The phase shift at a part in which the phase difference detected by the phase difference detection unit is smaller than the predetermined threshold cannot be determined by the focusing confirmation image. Therefore, the second color image for display is used as the image of the part, and therefore, the image of the focused part can be a high-quality image.

In the image capture device according to yet another aspect of the present invention, it is preferable that the predetermined threshold is H/N, wherein N represents the number of horizontal pixels of the display unit, and H represents the number of horizontal pixels of the image capture element. Therefore, the phase difference for which the phase shift cannot be checked by the display unit is set as a threshold. Further, a value fine-tuned by $k \times (H/N)$ (k: coefficient near 1) may be used as a threshold.

In the image capture device according to yet another aspect of the present invention, it is preferable to further include: a viewfinder used as an optical viewfinder or an electronic viewfinder; a finder switching unit (finder switch lever) that switches an electronic viewfinder mode for using the viewfinder as an electronic viewfinder and an optical viewfinder mode for using the viewfinder as an optical viewfinder; a synthesis unit (display control unit) that optically synthesizes an optical image of the optical viewfinder and the live-view image displayed by the display unit when the optical viewfinder mode is set; and a blocking unit (display control unit) that blocks incidence of the optical image to the synthesis unit at the switch to the electronic viewfinder mode by the finder switching unit, wherein the display control unit displays only the focusing confirmation image generated by the focusing confirmation image generation unit on the display unit at the switch to the optical viewfinder mode by the finder switching unit.

According to the aspect of the present invention, the viewfinder can be properly used as an electronic viewfinder and an optical viewfinder. When the viewfinder is used as an optical viewfinder, only the focusing confirmation image can be further displayed on the display unit to synthesize and display the focusing confirmation image on the optical image.

In the image capture device according to yet another aspect of the present invention, it is preferable that in the image capture element, pixels of the first pixel group and pixels of the second pixel group are arranged in pairs adjacently to each other. In this way, the phase difference can be accurately calculated.

The image capture device according to yet another aspect of the present invention further includes: a phase difference detection unit (central processing unit) that detects the phase difference between the first image and the second image output from the image capture element; a focus mode switching unit (dial) that switches a manual focus mode and an auto focus mode; and an automatic focus adjustment unit (central processing unit) that adjusts a position of the imaging lens so that the defocus amount of the imaging lens becomes zero based on the phase difference detected by the phase difference detection unit when the focus mode switching unit switches the mode to the auto focus mode.

In this way, the user can appropriately switch and use manual focus using the focusing confirmation image and auto focus based on the detected phase difference.

Yet another aspect of the present invention provides an image display method including: (a) a step of acquiring a first color image from an image capture element, the image capture element provided with color filters including a predetermined color filter array on pixels arranged in a matrix, the image capture element outputting the first color image with the same color array as the color array of the color filters, the image capture element including first and second pixel groups formed by pupil-dividing an object image passed through different first and second areas of an imaging lens, respectively, the image capture element including a third pixel group formed without pupil-dividing the object image; (b) a step of extracting first and second images corresponding to the first and second pixel groups from the acquired first color image, the first image and the second image having the same color array as the first color image or Bayer array; (c) a focusing confirmation image generation step of generating a color focusing confirmation image based on the extracted first image and second image; (d) an image processing step of generating a second color image for display based on a third image corresponding to the third pixel group in the acquired first color image; and (e) a step of displaying the color focusing confirmation image generated by the focusing confirmation image generation unit in a display area of the generated second color image for display, wherein the steps (a) to (e) are repeatedly executed to display, on a display unit, a live-view image in which the color focusing confirmation image is displayed.

In the image display method according to yet another aspect of the present invention, it is preferable that the image processing step includes a step of generating an image not pupil-divided corresponding to the first and second pixel groups based on the third image of the third pixel group, and a third color image for recording made of an image of all pixels of one screen that is not pupil-divided is generated.

According to the present invention, the image capture element provided with the color filters including the predetermined color filter array on the pixels arranged in a matrix is used, the image capture element outputting the first color image with the same color array as the color array of the color filters, the image capture element including the first and second pixel groups (first and second phase difference pixel groups) and the third pixel group (normal pixel group) without phase difference, the image capture element outputting, from the first and second phase difference pixel groups, first and second phase difference images with the same color array as the first color image or Bayer array, the image capture element outputting, from the normal pixel group, the third image with the same color array as the first color image. The color focusing confirmation image generated from the first and second phase difference images is displayed in the display area of the second color image for display generated from the third image. Therefore, the focus adjustment can be performed while viewing the color focusing confirmation image without a color shift during manual focus.

BRIEF DESCRIPTION OF THE DRAWINGS

FIG. 3 is a block diagram showing an embodiment of the image capture device shown in FIG. 1.

FIG. 5A is a diagram showing a configuration example of a first pixel that is a phase difference pixel.

FIG. 5B is a diagram showing a configuration example of a second pixel that is a phase difference pixel.

DETAILED DESCRIPTION OF THE PREFERRED EMBODIMENTS

Hereinafter, embodiments of an image capture device according to the present invention are explained with reference to the attached drawings.

[Appearance of Image Capture Device]

Figure 1:
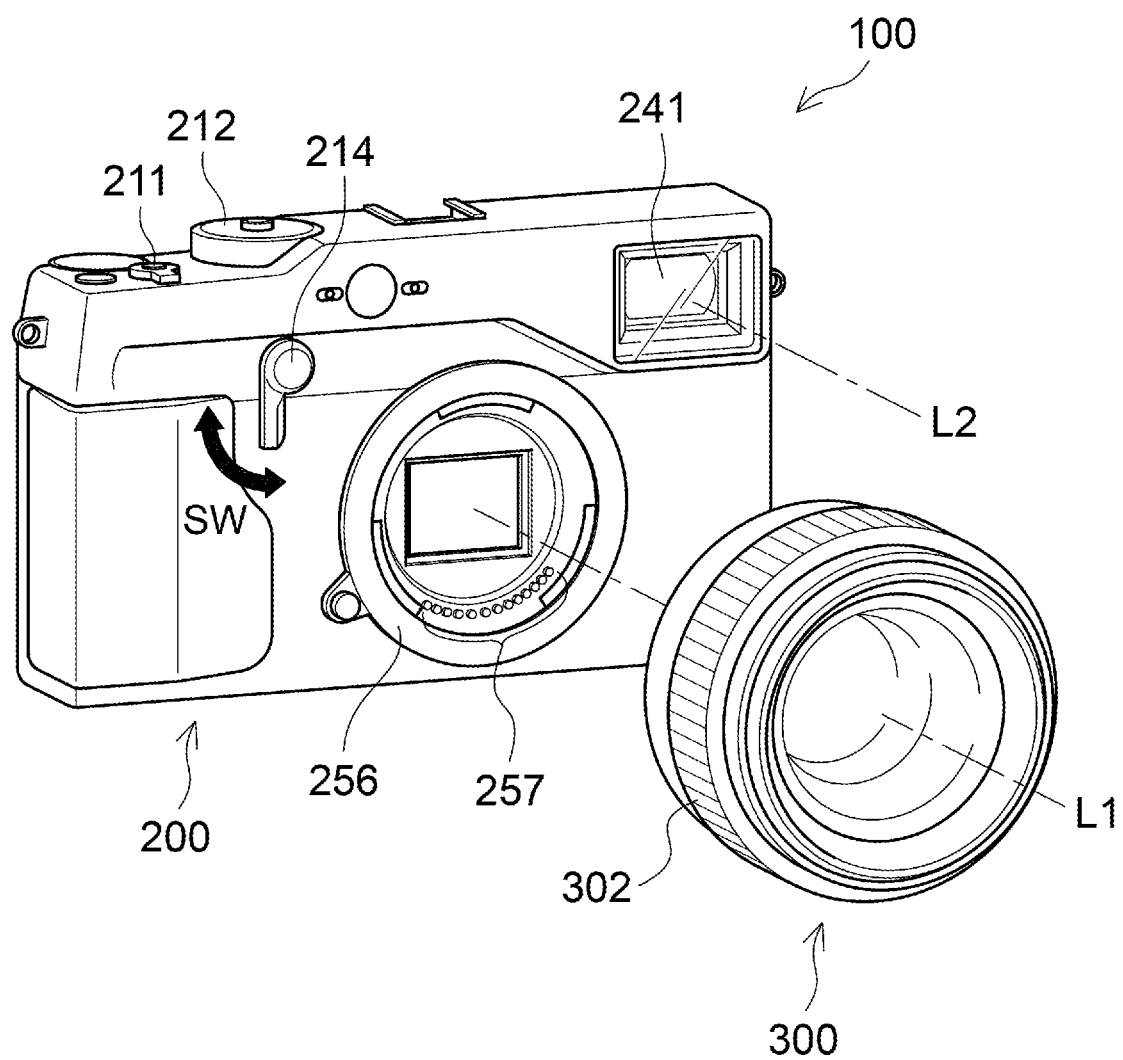
FIG. 1 is a perspective view of a diagonally front side of an image capture device that is a lens interchangeable camera according to an embodiment of the present invention.
Figure 2:
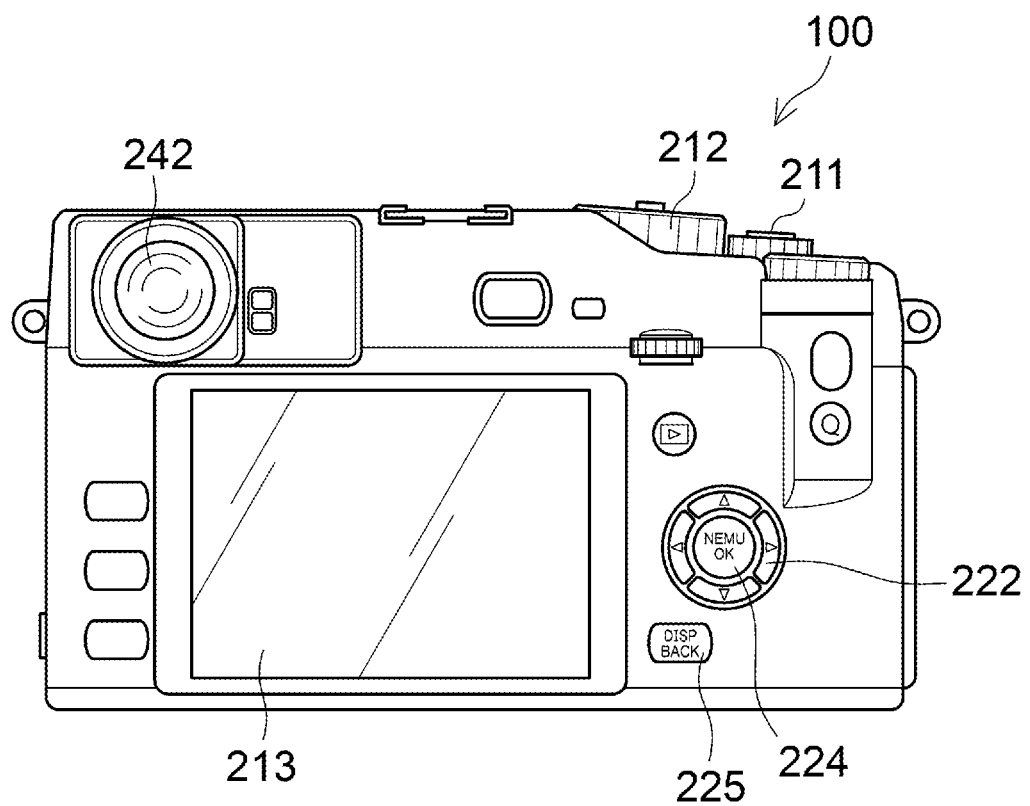
FIG. 2 is a rear view of the image capture device shown in FIG. 1.

FIG. 1 is a perspective view of a diagonally front side of an image capture device 100 that is a lens interchangeable camera according to an embodiment of the present invention, and FIG. 2 is a rear view of the image capture device 100.

The image capture device 100 includes a camera body 200 and an interchangeable lens 300 (imaging lens, focus ring 302 (manual operation unit)) mounted on the camera body 200 in an interchangeable manner and is a digital camera without a reflex mirror.

A mount 256 included in the camera body 200 and a mount 346 (FIG. 3) on the side of the interchangeable lens 300 corresponding to the mount 256 are connected to arrange the camera body 200 and the interchangeable lens 300 in an interchangeable manner.

Other than the mount 256, the front surface of the camera body 200 is provided with a finder window 241 of an optical viewfinder, a finder switch lever (finder switching unit) 214, and the like. When the finder switch lever 214 is rotated in an arrow SW direction, an image that can be visually recognized by the optical viewfinder is switched between an optical image and an electron image (live-view image) (described later). Note that an optical axis L2 of the optical viewfinder is an optical axis different from an optical axis L1 of the interchangeable lens 300. Further, the upper surface of the camera body 200 is mainly provided with a release button 211 and a dial 212 for setting an imaging mode and the like.

The back surface of the camera body 200 is mainly provided with a finder eyepiece 242 of the optical viewfinder, a display unit 213, cross keys 222, a MENU/OK key 224, and a BACK/DISP button 225.

The cross keys 222 function as multi-function keys for outputting various command signals for selecting a menu, zooming, frame advancing, and the like. The MENU/OK key 224 is an operation key with a function of a menu button for commanding display of a menu on the screen of the display unit 213 and with a function of an OK button for commanding confirmation, execution, and the like of selected content. The BACK/DISP button 225 is used to delete a desired target such as a selected item, to cancel instructed content, or to restore the previous operation state.

The display unit 213 is used to display a live-view image (through image) in the imaging mode and to display a reproduction image in a reproduction mode, as well as to display a menu screen and the like.

[Internal Configuration of Image Capture Device]

FIG. 3 is a block diagram showing an embodiment of the image capture device 100 according to the present invention.

The image capture device 100 is a digital camera that records taken still images and moving images, and a central processing unit (CPU) 12 comprehensively controls the operation of the entire camera.

An operation unit 14 of the image capture device 100 includes, as shown in FIG. 1 and FIG. 2, the release button 211, the dial (focus mode switching unit) 212 for selecting the imaging mode and the like, the display unit 213, the finder switch lever 214, the cross keys 222, the MENU/OK key 224, and the BACK/DISP button 225. Various operation signals from the operation unit 14 are added to the CPU 12.

When the imaging mode is set, image light indicating an object is focused on a light receiving surface of a color image capture element (for example, CMOS (complementary metal-oxide semiconductor) sensor) 20 through an imaging lens 16 including a focus lens that can be moved by manual operation and through a shutter 18.

The signal charge accumulated on the image capture element 20 is sequentially read as a digital signal according to the signal charge (voltage) based on a read signal added from a device control unit 22. Note that the image capture element 20 has a so-called electronic shutter function for controlling the charge accumulation time (shutter speed) of each photo sensor based on the timing of the read signal.

[Image Capture Element]

Next, a configuration of the image capture element 20 is explained.

Figure 4A:
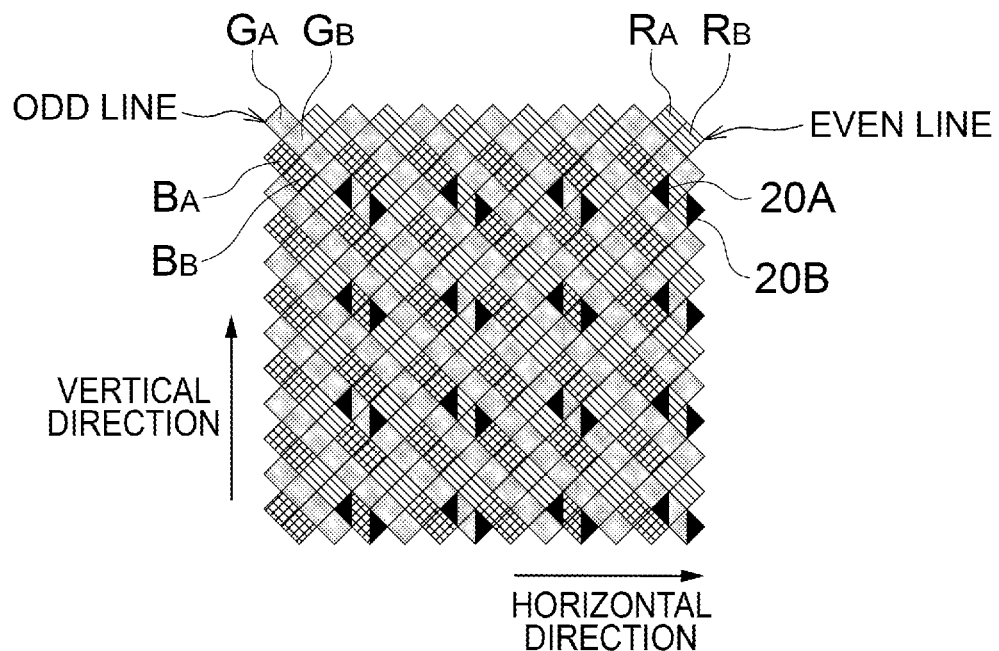
FIG. 4A is a diagram showing a color filter array of color filters and light shielding members provided on an image capture element (entire surface).
Figure 4B:
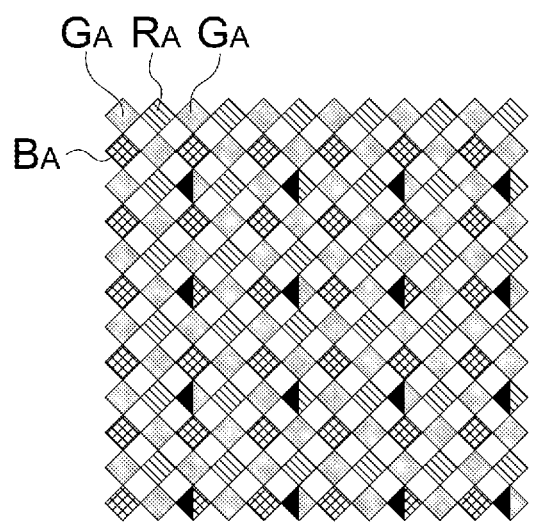
FIG. 4B is a diagram showing a color filter array of color filters and light shielding members provided on the image capture element (surface A).
Figure 4C:
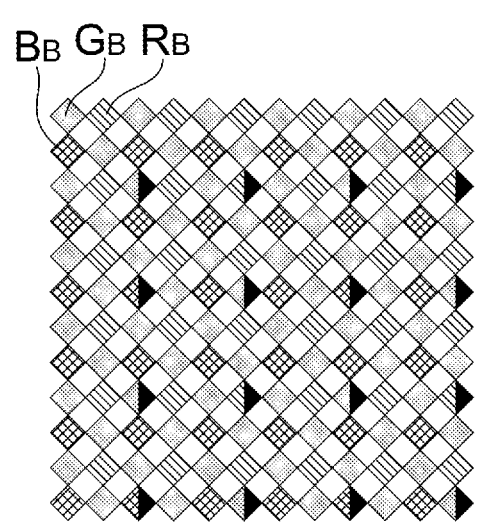
FIG. 4C is a diagram showing a color filter array of color filters and light shielding members provided on the image capture element (surface B).

FIGS. 4A to 4C illustrate a color filter array of color filters and light shielding members provided in the image capture element 20.

As shown in FIG. 4A, the image capture element 20 is provided with pixel groups of a surface A (FIG. 4B) and pixel groups of a surface B (FIG. 4C) in Bayer arrays as color filters of red (R), green (G), and blue (B) arranged on each pixel, and the pixel groups are shifted by half pitches with respect to each other in a horizontal direction and a vertical direction.

Further, the pixel groups of the surface A shown in FIG. 4B include a normal pixel group (third pixel group) $R_A$, $G_A$, and $B_A$ and a phase difference pixel group (first pixel group) for phase difference detection. The pixel groups of the surface B shown in FIG. 4C include a normal pixel group (third pixel group) $R_B$, $G_B$, and $B_B$ and a phase difference pixel group (second pixel group) for phase difference detection.

FIGS. 5A and 5B are diagrams showing an example of phase difference pixels arranged on the image capture element 20.

For a first pixel shown in FIG. 5A, a light shielding member 20A that blocks the left half of the light receiving surface is installed on the front surface side (microlens L side) of a photodiode PD. On the other hand, for a second pixel shown in FIG. 5B, a light shielding member 20B that blocks the right half of the light receiving surface is installed on the front surface side of the photodiode PD.

The microlens L and the light shielding members 20A and 20B function as a pupil division unit. The first pixel receives only the left side of the optical axis of the luminous flux passing through the exit pupil of the imaging lens 16, and the second pixel receives only the right side of the optical axis of the luminous flux passing through the exit pupil of the imaging lens 16. In this way, the microlens L and the light shielding members 20A and 20B as a pupil division unit divide the luminous flux passing through the exit pupil into left and right luminous fluxes, which enter the first pixel and the second pixel (phase difference pixels), respectively.

Further, of the luminous flux passing through the exit pupil of the imaging lens 16, the focused parts of an object image corresponding to the luminous flux of the left half and an object image corresponding to the luminous flux of the right half are formed at the same position on the image capture element 20, but the parts of front focus and back focus are incident on different positions on the image capture element 20 (phase is shifted). As a result, the object image corresponding to the luminous flux of the left half and the object image corresponding to the luminous flux of the right half can be acquired as parallax images with different parallax (left eye image, right eye image). Note that although the image capture element 20 of this embodiment is a CMOS type image sensor, the image capture element 20 is not limited to this, and the image capture element 20 may be a CCD (charge coupled device) image sensor.

Figure 6A:
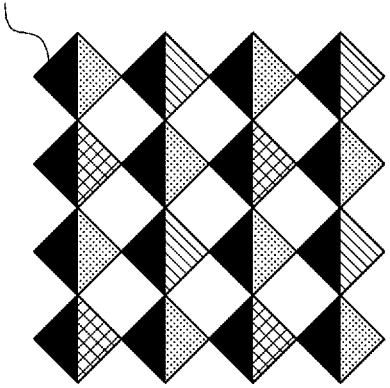
FIG. 6A is a diagram showing only one (first pixel group) of left and right phase pixel groups included in the image capture element shown in FIG. 4A.
Figure 6B:
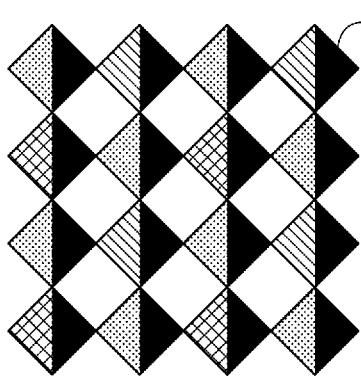
FIG. 6B is a diagram showing only the other (second pixel group) of the left and right phase pixel groups included in the image capture element shown in FIG. 4A.

FIG. 6A is a diagram showing only one (first pixel group shown in FIG. 4B) of the left and right phase pixel groups included in the image capture element 20 shown in FIG. 4A. FIG. 6B is a diagram showing only the other (second pixel group shown in FIG. 4C) of the left and right phase pixel groups included in the image capture element 20 shown in FIG. 4A.

As shown in FIG. 6A and FIG. 6B, the color filter arrays of the left and right phase pixel groups are Bayer arrays. More specifically, part of the pixels of the pixel groups of the surface A and the pixel groups of the surface B are arranged as phase pixels so that the color filter arrays of the left and right phase difference pixel groups form Bayer arrays.

Further, the pixels of the left and right phase pixel groups (first pixel group, second pixel group) are arranged in pairs adjacently to each other (at minimum pitch intervals). In this way, the phase difference between the left and right phase pixel groups can be accurately calculated.

Returning to FIG. 3, a first color image (RAW image: digital signal of surface A) with the same color array as the Bayer array of the surface A and a first color image (RAW image: digital signal of surface B) with the same color array as the Bayer array of the surface B are read from the image capture element 20 with the configuration, and the images are temporarily stored in a memory 26, such as an SDRAM (synchronous dynamic random access memory), through an interface unit 24.

An image processing unit 28 includes: a normal processing unit 30 that processes R, G, and B signals corresponding to the third pixel group among the digital signals (R, G, and B signals) of the surface A and the surface B to generate data of a normal color image (second color image); and a split image processing unit 32 (focusing confirmation image generation unit) that processes R, G, and B signals corresponding to the first and second pixel groups to generate a color split image.

The normal processing unit 30 and the split image processing unit 32 each includes: a WB gain unit that adjusts gains of the R, G, and B signals to perform white balance (WB) correction; a gamma correction unit that applies gamma correction to the WB-corrected R, G, and B signals; a synchronization processing unit that executes a color interpolation process according to the color filter array (Bayer array) of the image capture element 20 to generate synchronized R, G, and B signals; and the like, and each processing unit sequentially applies signal processing to the original digital signal (RAW data) primarily stored in the memory 26.

Figure 8:
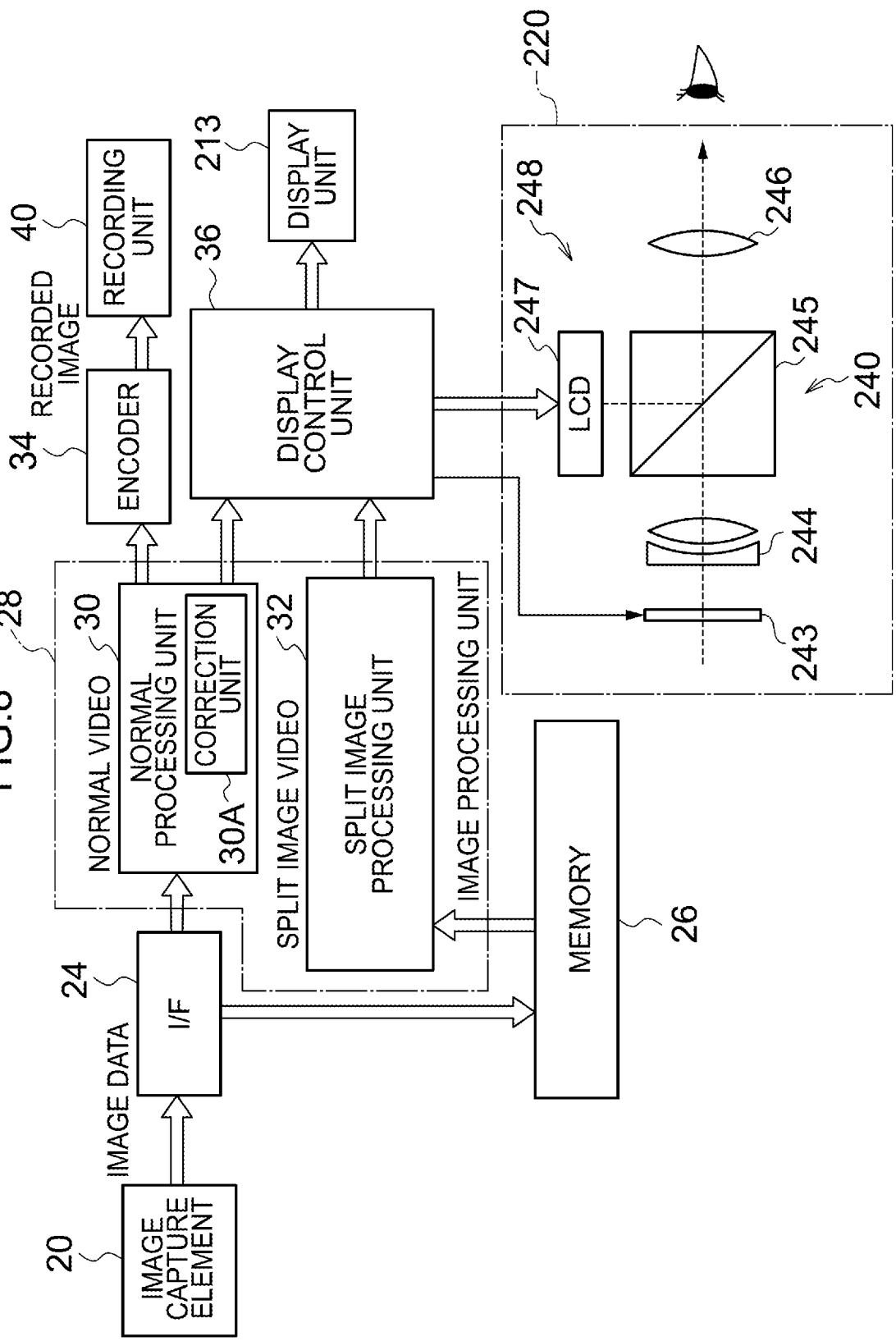
FIG. 8 is a functional block diagram of main parts of the image capture device.

An encoder 34 encodes the R, G, and B signals processed by the normal processing unit 30 to signals for recording, and the signals are recorded in a recording unit 40 (see FIG. 8).

Note that the image capture element 20 can change the exposure conditions (shutter speed of electronic shutter) of the pixel groups of the surface A and the pixel groups of the surface B, and therefore, two images in different exposure conditions can be acquired at the same time. The image processing unit 28 can generate an image of a wide dynamic range based on the two images in different exposure conditions. Further, two images can be acquired at the same time in the same exposure conditions, and the images can be added to generate a high-sensitivity image with little noise or to generate a high-resolution image.

The image data of the color image for display processed by the normal processing unit 30 and the image data of the color split image processed by the split image processing unit 32 are added to the display control unit 36. The display control unit 36 synthesizes the color split image in a display area of the input normal color image and outputs the synthesized image data to the display unit 213. Here, the split image generated by the split image processing unit 32 includes divided upper and lower images obtained by synthesizing an image (for example, upper image) generated from the phase difference pixel group of the surface A and an image (for example, lower image) generated from the phase difference pixel of the surface B, and the split image is an image in which the divided upper and lower images are shifted according to the focus state.

The method of synthesizing the color split image with the normal color image is not limited to the synthesis of setting the split image in place of the image of part of the normal color image. For example, synthesis of superimposing the split image on the normal color image may be adopted. Further, when the split image is superimposed, the split image may be superimposed by appropriately adjusting the transmittance of the image of part of the normal color image on which the split image is to be superimposed and the transmittance of the split image.

In this way, the live-view image indicating the continuously taken object image is displayed on the screen of the display unit 213, and the displayed live-view image is an image in which the color split image is displayed in the display area of the normal color image.

Further, a manual focus mode and an auto focus mode can be switched by the dial 212 (focus mode switching unit) in the image capture device 100, and it is preferable to display the live-view image with synthesized split image on the display unit 213 when the manual focus mode is selected.

On the other hand, when the auto focus mode is selected by the dial 212, the CPU 12 functions as a phase difference detection unit and an automatic focus adjustment unit. The phase difference detection unit detects the phase difference between the first image of the first pixel group and the second image of the second pixel group that are phase difference pixels, and the automatic focus adjustment unit controls a lens drive unit not shown from the device control unit 22 through the mounts 256 and 346 based on the detected phase difference to move the imaging lens 16 to the focus position so that the defocus amount (phase shift between the first and second images) of the imaging lens 16 becomes zero.

<First Embodiment of Live-View Image>

Figure 7A:
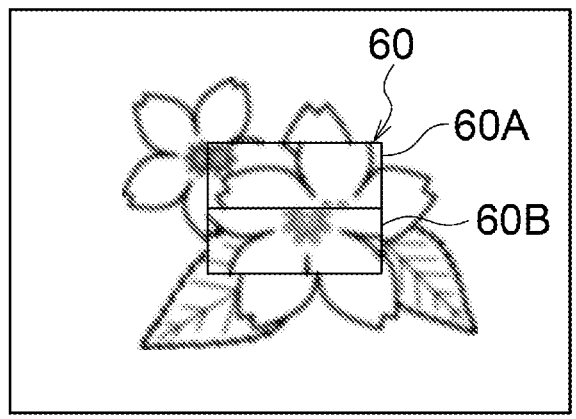
FIG. 7A is a diagram showing a first embodiment of a live-view image displayed on a display unit (when there is a phase difference).
Figure 7B:
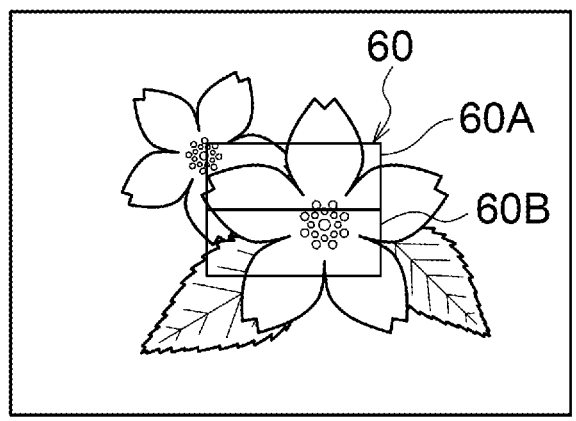
FIG. 7B is a diagram showing the first embodiment of the live-view image displayed on the display unit (when there is no phase difference).

FIG. 7A and FIG. 7B are diagrams showing a first embodiment of the live-view image displayed on the display unit 213.

As shown in FIGS. 7A and 7B, the split image is displayed inside of a frame 60 at the center of the screen, and the normal image is displayed outside of the frame 60.

More specifically, the first and second pixel groups are provided according to the size of the frame 60, and the split image includes an image (parallax image) of an upper half 60A of the frame 60 generated based on the first pixel group and an image (parallax image) of a lower half 60B of the frame 60 generated based on the second pixel group.

Now, when the imaging lens 16 is not focused on the object in the frame 60, images at the boundary between the parallax image of the upper half 60A of the split image and the parallax image of the lower half 60B are shifted in the parallax direction (horizontal direction) as shown in FIG. 7A, and images at the boundary between the normal image and the split image are also shifted in the parallax direction (phase difference is generated).

On the other hand, when the imaging lens 16 is focused on the object in the frame 60, the images at the boundary between the parallax image of the upper half 60A of the split image and the parallax image of the lower half 60b coincide as shown in FIG. 7B, and the images at the boundary between the normal image and the split image also coincide (phase difference is not generated).

The photographer can check the focus state of the imaging lens 16 through the split image displayed on the display unit 213, and in the manual focus mode, the focus ring 302 of the imaging lens 16 can be manually operated to set the shift amount (defocus amount) of the focus to zero.

Further, the normal image and the split image can be displayed by color images without a color shift, and the color split image can assist the manual focus adjustment of the photographer.

FIG. 8 is a functional block diagram of main parts of the image capture device 100. Note that the parts common to the block diagram shown in FIG. 3 are designated with the same reference numerals.

In FIG. 8, the normal processing unit 30 includes a correction unit 30A that inputs RAW data (RAW image) of R, G, and B output from the interface unit 24 to interpolate and generate pixels of R, G, and B at the positions of the first and second pixel groups based on surrounding pixels of the same colors in the third pixel group. In this way, a RAW image of the third pixel group for one screen can be obtained as in an image capture element including only the third pixel group, and a normal color image (third color image) for recording can be generated based on the RAW image of the third pixel group.

The normal processing unit 30 outputs the image data of the generated color image for recording to the encoder 34 and the display control unit 36.

Meanwhile, the split image processing unit 32 extracts R, G, and B signals of the first pixel group and the second pixel group from the RAW data temporarily stored in the memory 26 and generates a color split image (image in the frame 60 of FIGS. 7A and 7B) based on the R, G, and B signals of the first pixel group and the second pixel group.

The first pixel group and the second pixel group extracted from the RAW data are Bayer arrays as shown in FIGS. 6A and 6B, and the split image processing unit 32 can execute image processing including synchronization processing and the like as in the normal processing unit 30 based on the R, G, and B signals of the first pixel group and the second pixel group with the Bayer arrays to thereby generate left and right parallax images. Then, the split image processing unit 32 synthesizes an image of the upper half (upper half 60A of the frame 60 shown in FIGS. 7A and 7B) of the left parallax image with an image of the lower half (lower half 60B of the frame 60 shown in FIGS. 7A and 7B) of the right parallax image to generate a split image and outputs the image data of the generated split image to the display control unit 36.

Note that since the left half or the right half of the light receiving surface is blocked in the first pixel group and the second pixel group, the R, G, and B signals of the first pixel group and the second pixel group have values smaller than the R, G, and B signals of the third pixel group. Therefore, it is preferable that the split image processing unit 32 correct the brightness so that the brightness of the split image becomes the same brightness as the image generated from the third pixel group.

Further, the normal processing unit 30 and the split image processing unit 32 concurrently apply image processing to RAW data, every time the RAW data of one screen is acquired by the image capture element 20.

The display control unit 36 generates image data for display based on the image data for recording corresponding to the third pixel group added from the normal processing unit 30 and based on the image data of the split image corresponding to the first and second pixel groups added from the split image processing unit 32.

More specifically, the display control unit 36 resizes the input image for recording and the input split image according to the screen size (the number of vertical and horizontal pixels) of the display unit 213 and the screen size in the frame 60 shown in FIGS. 7A and 7B and synthesizes the split image with part of the image (image for display) after the resize of the image for recording to thereby generate the image data for display.

The image data with the synthesized split image is output to the display unit 213. In this way, the display unit 213 displays a live-view image indicating the object image, in which the color split image is synthesized with part of the normal color image.

Further, when a moving image mode is selected as the imaging mode by the dial 212, image data for recording (moving image data) generated by the normal processing unit 30 is recorded in the recording unit 40 through the encoder 34. When a still image mode is selected as the imaging mode, image data for recording (still image data) generated by the normal processing unit 30 at the shutter release is recorded in the recording unit 40 through the encoder 34.

[Hybrid Finder]

A hybrid finder 220 provided on the camera body 200 is used as an optical viewfinder (OVF) 240 or an electronic viewfinder (EVF) 248. The OVF 240 is a reverse Galileo type finder mainly including an objective lens 244 and an ocular lens 246, and the EVF 248 mainly includes a liquid crystal display unit (LCD) 247, a prism (synthesis unit) 245, and the ocular lens 246.

Further, a liquid crystal shutter 243 is installed in front of the objective lens 244, and the liquid crystal shutter 243 blocks the light to prevent the optical image from entering the objective lens 244 when the hybrid finder 220 is used as the EVF.

The prism 245 reflects the electron image or various information displayed on the LCD 247 to guide them to the ocular lens 246 and synthesizes the optical image with the information (electron image, various information) displayed on the LCD 247.

Here, when the finder switch lever 214 is rotated in the arrow SW direction, an OVF mode that can visually recognize the optical image by the OVF and an EVF mode that can visually recognize the electron image by the EVF are alternately switched every time the finder switch lever 214 is rotated.

In the OVF mode, the display control unit 36 controls the liquid crystal shutter 243 to enter a non-blocked state, and the optical image can be visually recognized from the eyepiece. Further, only the split image is displayed on the LCD 247. In this way, a finder image in which the split image is superimposed on part of the optical image can be displayed.

On the other hand, in the EVF mode, the display control unit 36 controls the liquid crystal shutter 243 to enter a blocked state, and only the electron image displayed on the LCD 247 can be visually recognized from the eyepiece. Note that image data equivalent to the image data with the synthesized split image output to the display unit 213 is added to the LCD 247, and this can display an electron image in which the split image is synthesized with part of the normal image, as in the display unit 213.

<Second Embodiment of Live-View Image>

Figure 9:
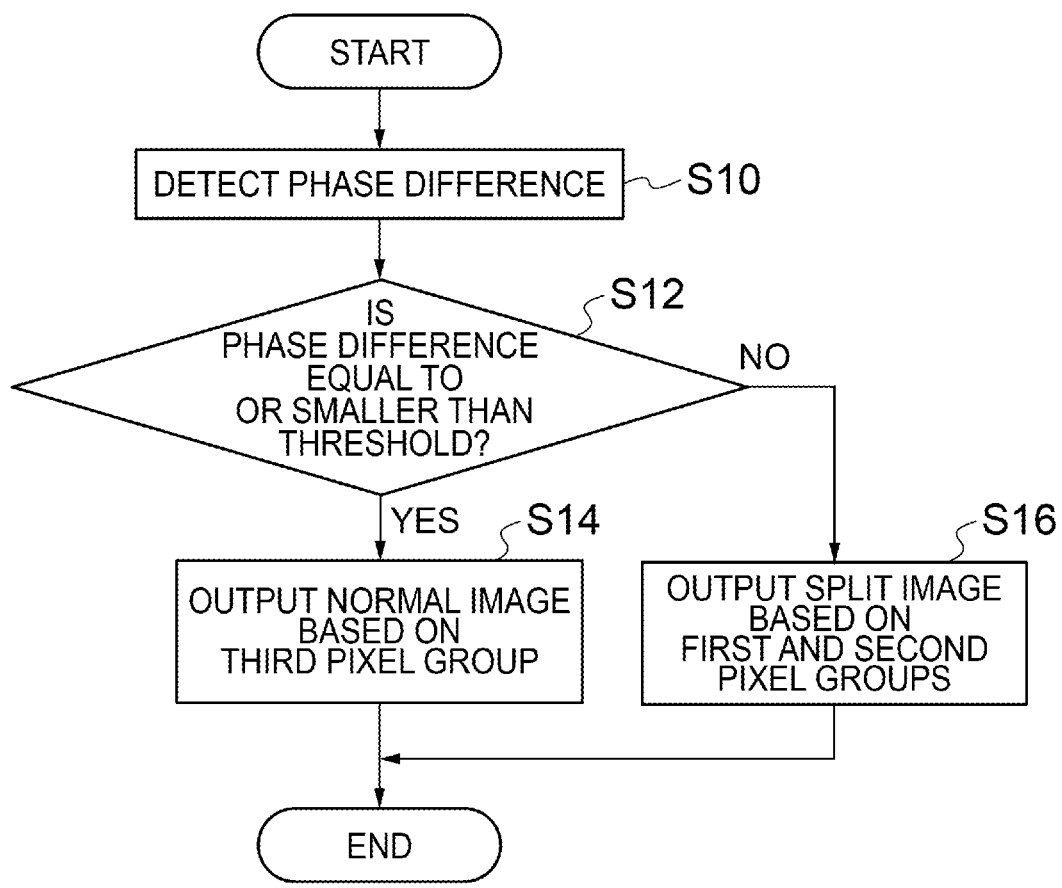
FIG. 9 is a flow chart showing a method of generating a live-view image of a second embodiment.

FIG. 9 is a flow chart showing a method of generating a live-view image according to a second embodiment.

In FIG. 9, the CPU 12 detects, for each pixel, the phase difference between the first image of the first pixel group and the second image of the second pixel group that are phase difference pixels (step S10).

Subsequently, for each pixel in the area corresponding to the split image, whether the phase difference detected for each pixel is equal to or smaller than a predetermined threshold set in advance is determined (step S12).

Here, it is preferable to set the predetermined threshold to a phase difference that serves as a boundary of whether the phase difference between the images of the first and second pixel groups can be visually recognized on the live-view image in which the split image displayed on the display unit 213 is synthesized.

If the phase difference between the pixels to be determined is equal to or smaller than the predetermined threshold in step S12 (if "Yes"), the process moves to step S14. If the phase difference exceeds the predetermined threshold (if "No"), the process moves to step S16.

In step S14, the image (normal image) of the third pixel group corresponding to the same pixel position is output in place of the image of the first or second pixel group, and in step S16, the image (split image) of the first or second pixel group is output as it is.

The process from step S10 to step S16 is repeatedly executed every time the image capture element 20 takes moving images or through images at a constant frame rate to thereby display the live-view image with the synthesized split image on the display unit 213, and as a result, the focus state during manual focus can be checked. Therefore, focusing by manual operation can be assisted.

Figure 10:
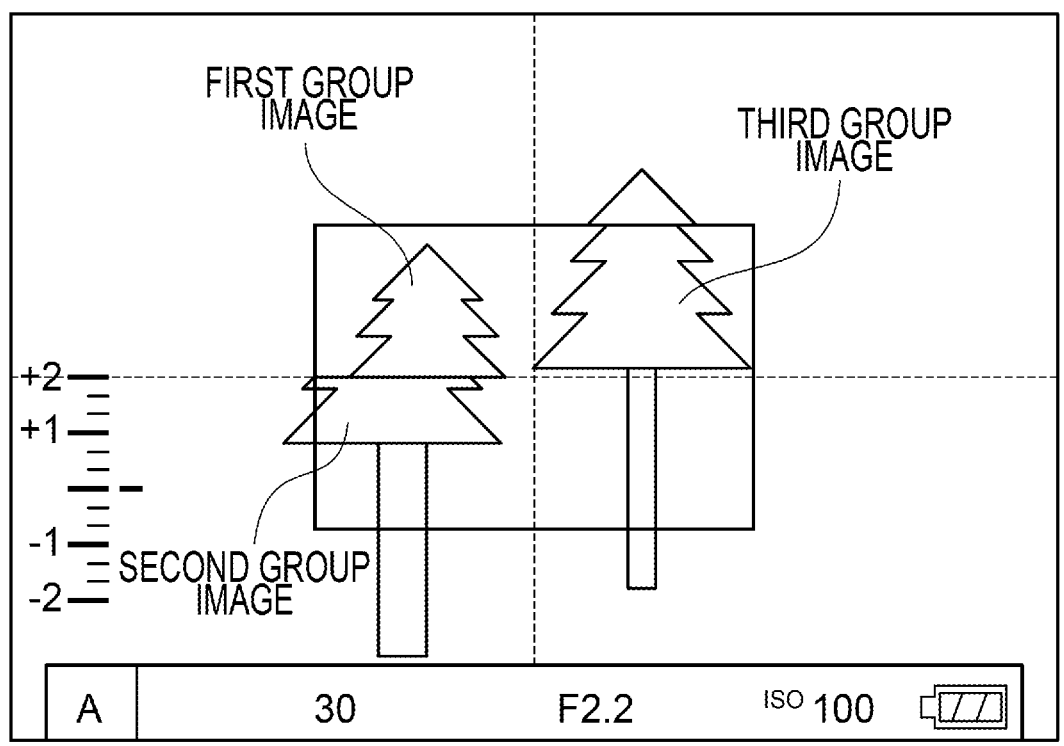
FIG. 10 is a diagram showing the live-view image of the second embodiment.

FIG. 10 is a diagram showing the live-view image according to the second embodiment generated as described above.

The split image is usually displayed in the frame 60 at the center of the screen of the display unit 213, and in the example shown in FIG. 10, normal images of the third pixel group are displayed in upper right and lower right areas among four areas of upper right, lower right, upper left, and lower left in the frame 60. An image of the first pixel group is displayed in the upper left area, and an image of the second pixel group is displayed in the lower left area.

More specifically, the phase differences of the images of the first and second pixel groups in the upper right and lower right areas in the frame 60 are determined to be equal to or smaller than the predetermined threshold, and therefore, the normal image of the third pixel group is displayed in place of the image of the first or second pixel group.

In this way, the images of the first and second pixel groups with the phase differences determined to be equal to or smaller than the predetermined threshold can be replaced with the normal images of the third pixel group, and the images of the third image group with better image quality than the images of the first and second pixel groups can be set in the areas in which the determination of the phase difference is difficult (that is, focused areas).

<Third Embodiment of Live-View Image>

Figure 11:
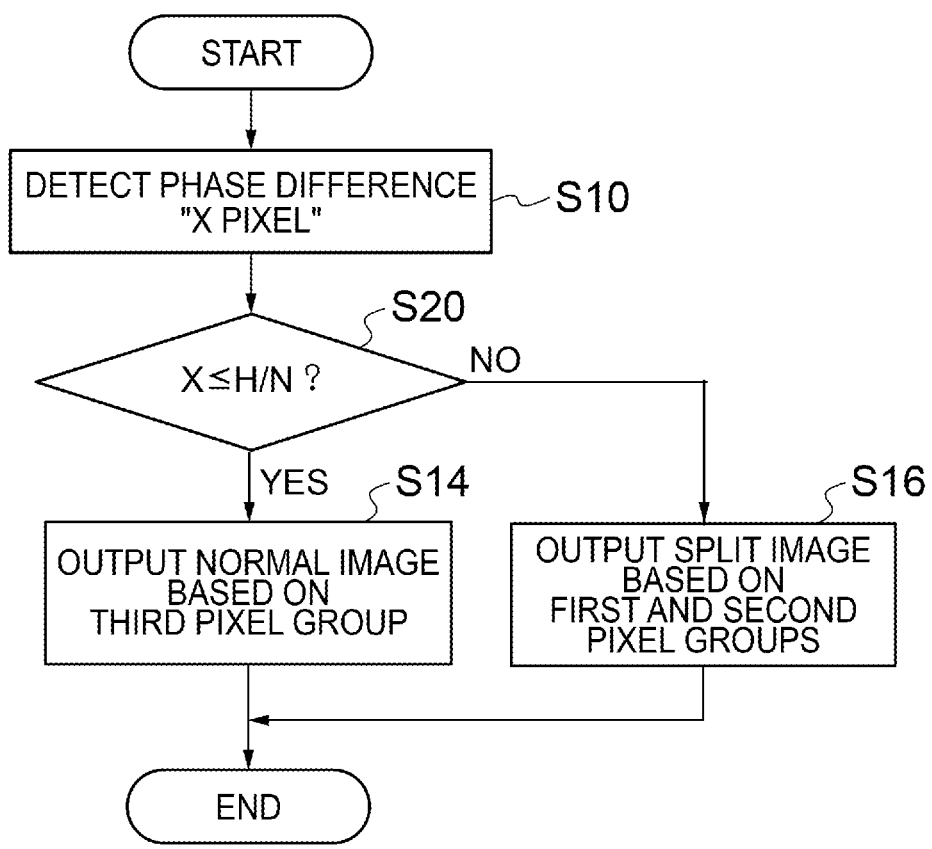
FIG. 11 is a flow chart showing a method of generating a live-view image of a third embodiment.

FIG. 11 is a flow chart showing a method of generating a live-view image according to a third embodiment. Note that the parts common to the flow chart shown in FIG. 9 are designated with the same step numbers, and the detailed explanation is omitted.

In FIG. 11, the phase difference in the area corresponding to the split image is detected for each pixel in step S10, and the phase difference of each pixel in the area will be called an "X pixel".

Subsequently, whether the phase difference "X pixel" of each pixel is equal to or smaller than a threshold (H/N) set in advance (whether X≤H/N is satisfied) is determined for each pixel in the area corresponding to the split image (step S20).

Figure 12:
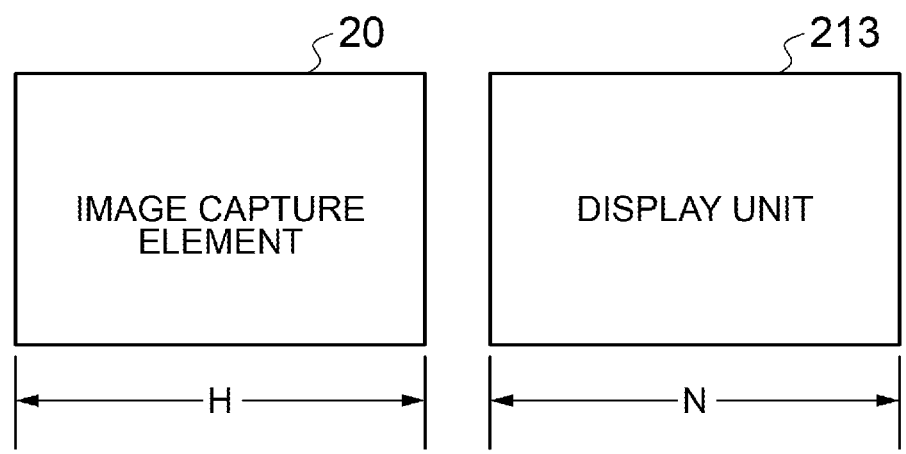
FIG. 12 is a diagram showing the number of pixels in a horizontal direction of the image capture element and the display unit.

Here, H and N in the discriminant (X≤H/N) designate the numbers of pixels of the image capture element 20 and the display unit 213 in the horizontal direction, respectively, as shown in FIG. 12.

More specifically, if X≤H/N, wherein the phase difference of an arbitrary pixel in the area corresponding to the split image is an X pixel, the phase difference is equal to or smaller than the resolution of the display unit 213, and the split image is not split on the display unit 213. Therefore, the threshold set in advance is H/N.

Note that the predetermined threshold is not limited to H/N, and a slightly adjusted value based on H/N, such as k×H/N (k: coefficient near 1), may be used as a threshold. Further, in the case of an image capture device including two display units, i.e. the display unit 213 on the back surface of the camera body 200 and the LCD 247 of the EVF, the threshold is set by setting N to the number of pixels in the horizontal direction of one of the display units that displays the image.

<Fourth Embodiment of Live-View Image>

A case of using the hybrid finder 220 by switching the hybrid finder 220 to the OVF in the image capture device 100 including the hybrid finder 220 as shown in FIG. 8 is explained.

In this case, the display control unit 36 controls the liquid crystal shutter 243 to enter the non-blocked state to allow visually recognizing the optical image from the eyepiece, and meanwhile, only the split image is displayed on the LCD 247.

Figure 13:
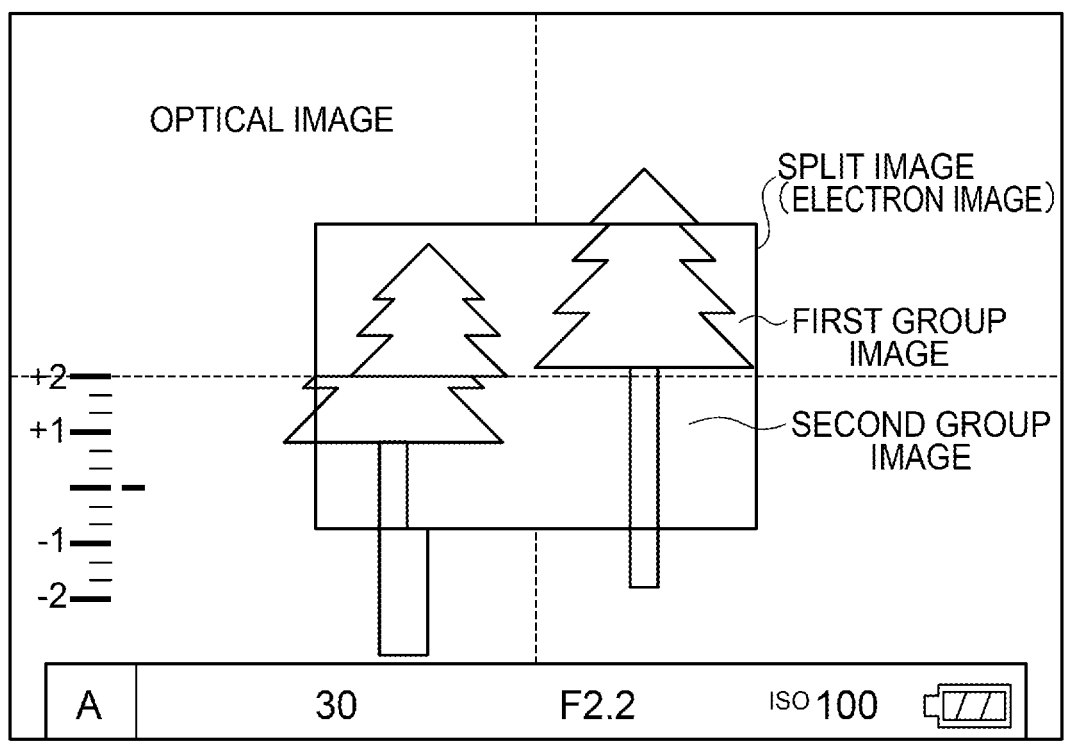
FIG. 13 is a diagram showing a finder image of an optical viewfinder (OVF) in which a split image is superimposed and displayed.

In this way, a finder image in which the split image (electron image) is superimposed on part of the optical image can be displayed as an image displayed on the OVF as shown in FIG. 13. Note that the display method is not limited to the case of superimposing the split image on part of the optical image, and part of the optical image may be masked by the liquid crystal shutter 243 or the like to synthesize the split image in the masked area.

[Another Embodiment of Image Capture Element]

Figure 14:
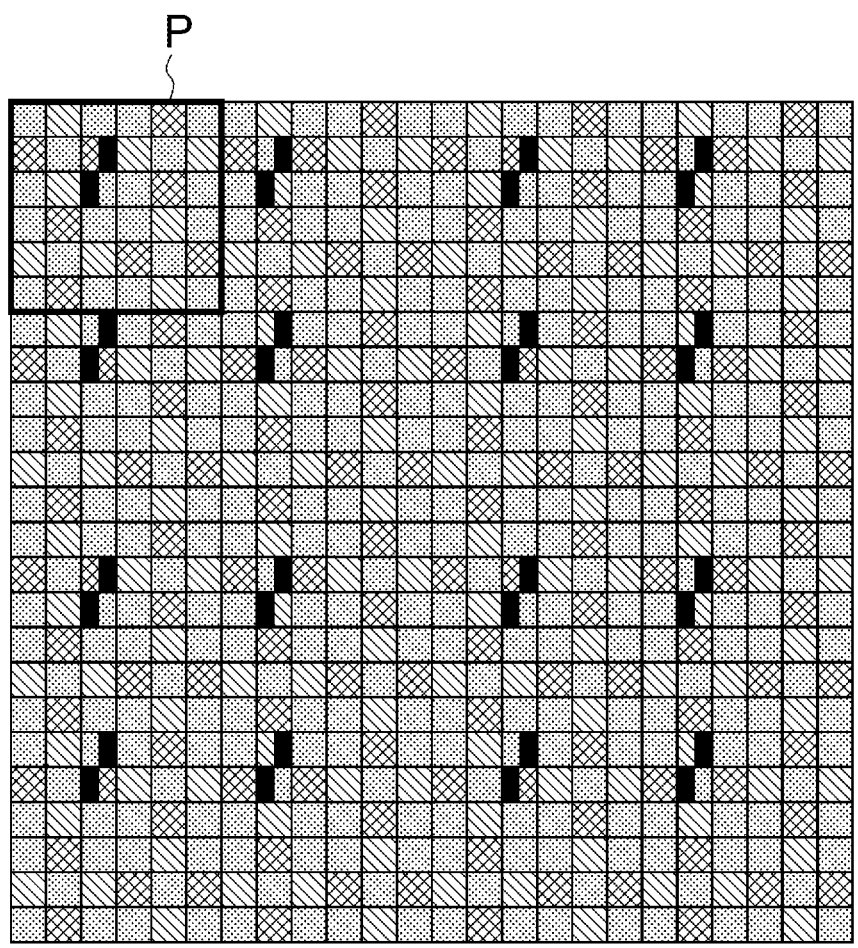
FIG. 14 is a diagram showing a color filter array of color filters and light shielding members provided on the image capture element of another embodiment.

FIG. 14 is a diagram showing another embodiment of the image capture element to which the present invention is applied and particularly illustrates a color filter array of color filters and light shielding members provided in the image capture element.

The color filter array of the image capture element shown in FIG. 14 includes a basic array pattern P (pattern indicated by a thick frame) made of a square array pattern corresponding to 6×6 pixels, and the basic array pattern P is repeatedly arranged in the horizontal direction and the vertical direction. Therefore, the filters of each color of R, G, and B are arranged with predetermined periodicity in the color filter array.

Further, as in the image capture element shown in FIG. 4A, the image capture element shown in FIG. 14 includes phase difference pixel groups for phase difference detection (first pixel group, second pixel group) and a normal pixel group (third pixel group).

The left half of the light receiving surface of the first pixel group is blocked by the light shielding members, and the right half of the light receiving surface of the second pixel group is blocked by the light shielding members. On the other hand, the third pixel group is not provided with the light shielding members.

Figure 15A:
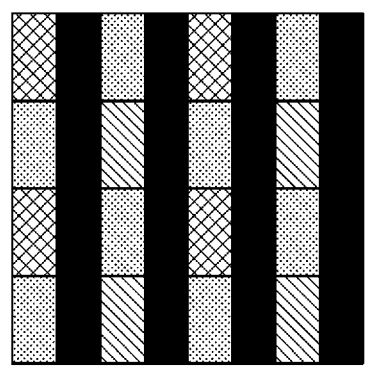
FIG. 15A is a diagram showing only one (second pixel group) of left and right phase pixel groups included in the image capture element shown in FIG. 14.
Figure 15B:
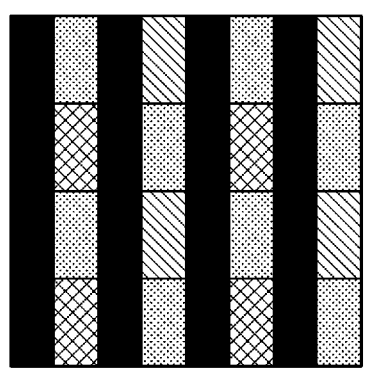
FIG. 15B is a diagram showing only the other (first pixel group) of the left and right phase pixel groups included in the image capture element shown in FIG. 14.

FIG. 15A is a diagram showing only one (second pixel group) of the left and right phase pixel groups included in the image capture element shown in FIG. 14. FIG. 15B is a diagram showing only the other (first pixel group) of the left and right phase pixel groups included in the image capture element shown in FIG. 14.

As shown in FIGS. 15A and 15B, the color filter arrays of the left and right phase pixel groups are Bayer arrays. More specifically, part of the pixels of all pixel groups of the image capture element are arranged as phase pixels so that the color filter arrays of the left and right phase difference pixel groups form Bayer arrays.

The color filter array of the image capture element shown in FIG. 14 includes the basic array pattern P of 6×6 pixels, which is more complicated than a Bayer array including a basic array pattern of 2×2 pixels. Therefore, signal processing, such as synchronization processing, is complicated. However, the phase difference pixels are arranged so that the color filter arrays of the left and right phase pixel groups form Bayer arrays, and the signal processing, such as synchronization processing, for generating a split image can be easily performed.

Note that although the phase difference pixels are arranged so that the color filter arrays of the left and right phase pixel groups form Bayer arrays as shown in FIGS. 15A and 15B, the array pattern is not limited to this. For example, phase difference pixels (first pixels, second pixels) may be arranged every six pixels in the horizontal direction and the vertical direction in the color filter array shown in FIG. 14 so that the color arrays of the first and second pixel groups are the same color arrays as in the original RAW image.

The image capture device 100 of this embodiment is a lens interchangeable digital camera without a reflex mirror. Although the auto focus function cannot be used when an unknown interchangeable lens is mounted in this type of digital camera, the manual focus can be performed by displaying the split image according to the present invention. Note that the present invention is not limited to the lens interchangeable digital camera without a reflex mirror, and the present invention can also be applied to an image capture device including an integrated lens.

Further, although the image capture device 100 of this embodiment includes the display unit 213 and the hybrid finder 220 of the camera back side, only one of them may be included.

[Other Embodiments of Image Capture Device]

Examples of the portable terminal device as other embodiments of the image capture device 100 include a portable phone, a smartphone, a PDA (Personal Digital Assistants), and a portable game machine with a camera functions. Hereinafter, an example of a smartphone is explained in detail with reference to the drawings.

<Configuration of Smartphone>

Figure 16:
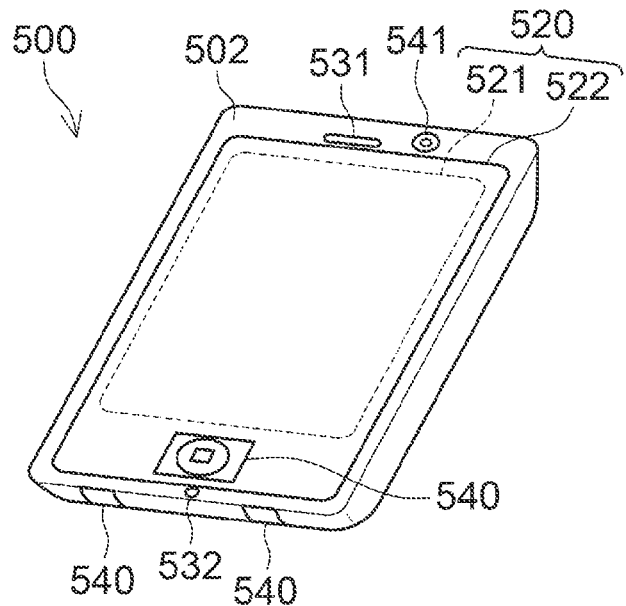
FIG. 16 is an external view of a smartphone that is another embodiment of the image capture device.

FIG. 16 shows an appearance of a smartphone 500 as another embodiment of the image capture device 10. The smartphone 500 shown in FIG. 16 includes: a planar housing 502; and a display input unit 520 in which a display panel 521 as a display unit and an operation panel 522 as an input unit are integrated on one of the surfaces of the housing 502. Further, the housing 502 includes a speaker 531, a microphone 532, an operation unit 540, and a camera unit 541. Note that the configuration of the housing 502 is not limited to this, and for example, a configuration in which the display unit and the input unit are independent can be adopted, or a configuration including a folding structure or a slide mechanism can be adopted.

Figure 17:
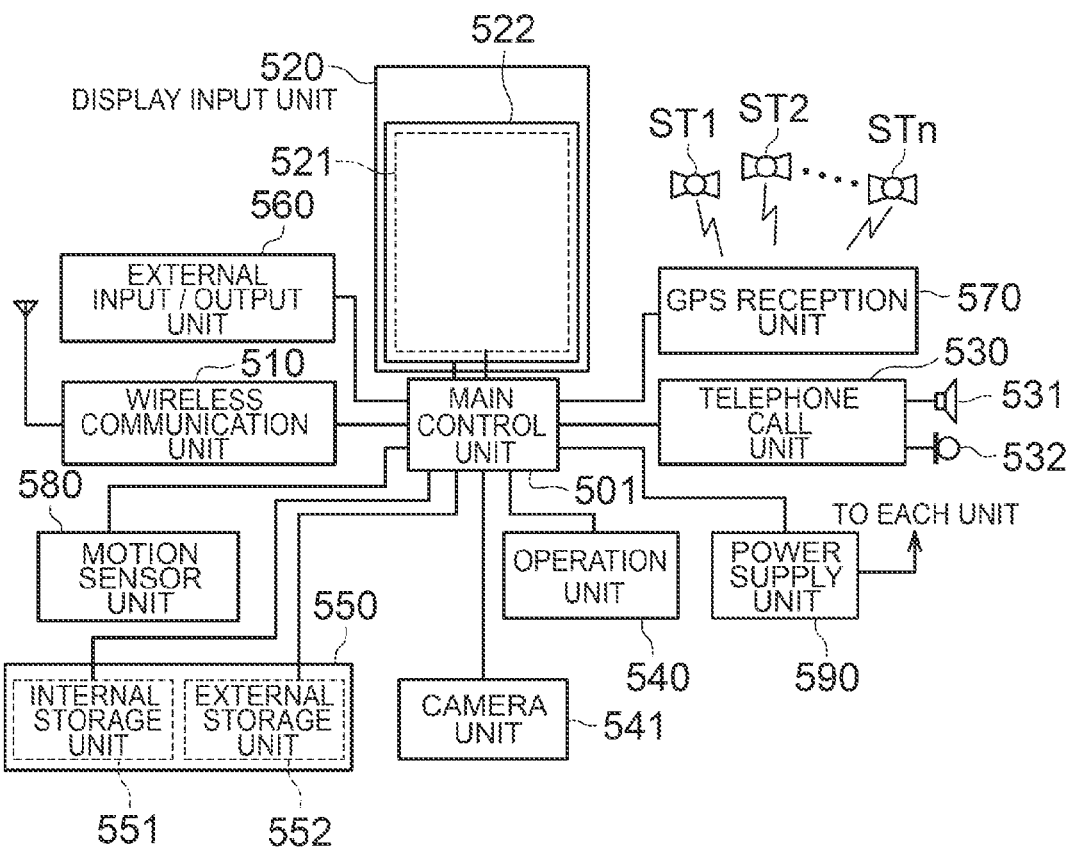
FIG. 17 is a block diagram showing a configuration of main parts of the smartphone.

FIG. 17 is a block diagram showing a configuration of the smartphone 500 shown in FIG. 16. As shown in FIG. 17, main constituent elements of the smartphone include a wireless communication unit 510, the display input unit 520, a telephone call unit 530, the operation unit 540, the camera unit 541, a storage unit 550, an external input/output unit 560, a GPS (Global Positioning System) reception unit 570, a motion sensor unit 580, a power supply unit 590, and a main control unit 501. Further, main functions of the smartphone 500 include a wireless communication function for performing mobile wireless communication through a base station apparatus BS and a mobile communication network NW.

The wireless communication unit 510 performs wireless communication with the base station apparatus BS housed in the mobile communication network NW according to an instruction of the main control unit 501. The wireless communication is used to transmit and receive voice data, various file data such as image data, electronic mail data, and the like and to receive Web data, streaming data, and the like.

The display input unit 520 is a so-called touch panel for displaying images (still images and moving images), character information, and the like to visually transmit information to the user and for detecting user operation for the displayed information based on the control of the main control unit 501 and includes the display panel 521 and the operation panel 522. It is preferable that the display panel 521 be a 3D display panel to view generated 3D images.

The display panel 521 is a panel in which an LCD (Liquid Crystal Display), an OELD (Organic Electro-Luminescence Display), or the like is used as a display device. The operation panel 522 is a device that is mounted to allow visually recognizing images displayed on the display surface of the display panel 521 and that detects one or a plurality of coordinates operated by a finger of the user or a stylus. When the device is operated by a finger of the user or a stylus, a detection signal generated by the operation is output to the main control unit 501. Next, the main control unit 501 detects an operation position (coordinates) on the display panel 521 based on the received detection signal.

As shown in FIG. 16, the display panel 521 and the operation panel 522 of the smartphone 500 are integrated to form the display input unit 520, and the operation panel 522 is arranged to completely cover the display panel 521. When this arrangement is adopted, the operation panel 522 may have a function of detecting user operation for an area outside of the display panel 521. In other words, the operation panel 522 may include a detection area (hereinafter, called display area) for a superimposed part overlapping with the display panel 521 and a detection area (hereinafter, called non-display area) for a peripheral part other than the detection area not overlapping with the display panel 521.

Note that although the size of the display area and the size of the display panel 521 may completely match, the sizes may not match. Further, the operation panel 522 may include two sensitive areas, a peripheral part and an inside part other than the peripheral part. Further, the width of the peripheral part is appropriately designed according to the size of the housing 502 or the like. Furthermore, examples of the position detection system adopted in the operation panel 522 include a matrix switch system, a resistive film system, a surface acoustic wave system, an infrared system, an electromagnetic induction system, and an electrostatic capacitance system, and any system can be adopted.

The telephone call unit 530 includes the speaker 531 and the microphone 532 and is configured to convert voice of the user input through the microphone 532 into voice data that can be processed by the main control unit 501 to output the voice data to the main control unit 501 and to decode voice data received by the wireless communication unit 510 or the external input/output unit 560 to output the voice data from the speaker 531. Further, as shown in FIG. 16, for example, the speaker 531 can be mounted on the same surface as the surface provided with the display input unit 520, and the microphone 532 can be mounted on the side surface of the housing 502.

The operation unit 540 is a hardware key using a key switch or the like and is configured to receive an instruction from the user. For example, as shown in FIG. 16, the operation unit 540 is mounted on the lower part and the lower surface of the display unit of the housing 502 of the smartphone 1. The operation unit 540 is a push-button type switch that is turned on when pressed by a finger or the like and that enters an off state due to restoring force of a spring or the like when the finger is detached.

The storage unit 550 stores a control program and control data of the main control unit 501, address data associating the name, the phone number, and the like of the communication partner, data of transmitted and received electronic mail, Web data downloaded by Web browsing, and downloaded content data and also temporarily stores streaming data and the like. Further, the storage unit 550 includes an internal storage unit 551 embedded in the smartphone and an external storage unit 552 including a removal external memory slot. Note that the internal storage unit 551 and the external storage unit 552 included in the storage unit 550 are realized by using storage media, such as a flash memory type (flash memory type), a hard disk type (hard disk type), a multimedia card micro type (multimedia card micro type), a card-type memory (for example, Micro SD (registered trademark) memory or the like), a RAM (Random Access Memory), and a ROM (Read Only Memory).

The external input/output unit 560 serves as an interface with all external devices connected to the smartphone 500 and is for direct or indirect connection with another external device through communication or the like (for example, universal serial bus (USB), IEEE 1394, or the like) or through a network (for example, Internet, wireless LAN, Bluetooth (Bluetooth) (registered trademark), RFID (Radio Frequency Identification), infrared communication (Infrared Data Association: IrDA), (registered trademark), UWB (Ultra Wideband) (registered trademark), ZigBee (ZigBee) (registered trademark), or the like).

Examples of the external devices connected to the smartphone 500 include a wired/wireless head set, a wired/wireless external charger, a wired/wireless data port, a memory card (Memory card) or a SIM (Subscriber Identity Module Card)/UIM (User Identity Module Card) card connected through a card socket, an external audio video device connected through an audio video I/O (Input/Output) terminal, a wirelessly connected external audio video device, a smartphone for wired/wireless connection, a personal computer for wired/wireless connection, a PDA for wired/wireless connection, an earphone, and the like. The external input/output unit can transmit data transmitted from the external devices to each constituent element inside of the smartphone 500 and can transmit data inside of the smartphone 500 to the external devices.

The GPS reception unit 570 receives GPS signals transmitted from GPS satellites ST1 to STn according to an instruction of the main control unit 501 and executes positioning arithmetic processing based on the plurality of received GPS signals to detect the position including latitude, longitude, and altitude of the smartphone 500. When position information can be acquired from the wireless communication unit 510 or the external input/output unit 560 (for, example, wireless LAN), the GPS reception unit 570 can also use the position information to detect the position.

The motion sensor unit 580 includes, for example, a triaxial acceleration sensor or the like and detects physical motion of the smartphone 500 according to an instruction of the main control unit 501. The movement direction and the acceleration of the smartphone 500 are detected by the detection of the physical motion of the smartphone 500. The detection result is output to the main control unit 501.

The power supply unit 590 supplies power stored in a battery (not shown) to each unit of the smartphone 500 according to an instruction of the main control unit 501.

The main control unit 501 includes a microprocessor and is configured to operate according to a control program or control data stored in the storage unit 550 to comprehensively control each unit of the smartphone 500. Further, the main control unit 501 has a mobile communication control function and an application processing function for controlling each unit of the communication system in order to perform voice communication and data communication through the wireless communication unit 510.

The application processing function is realized by the operation of the main control unit 501 according to application software stored in the storage unit 550. Examples of the application processing function include an infrared communication function of controlling the external input/output unit 560 to perform data communication with an opposing device, an electronic mail function of transmitting and receiving electronic mail, a Web browsing function of browsing a Web page, a function of generating a 3D image from a 2D image according to the present invention, and the like.

Further, the main control unit 501 has an image processing function such as for displaying images on the display input unit 520 based on image data (data of still images and moving images) such as received data and downloaded streaming data. The image processing function denotes a function by the main control unit 501 decoding the image data and applying image processing to the decoding result to display images on the display input unit 520.

Furthermore, the main control unit 501 executes display control for the display panel 521 and operation detection control for detecting user operation through the operation unit 540 and the operation panel 522.

Through the execution of the display control, the main control unit 501 displays an icon for activating the application software and a software key such as a scroll bar or displays a window for creating electronic mail. Note that the scroll bar denotes a software key for receiving an instruction for moving the display part of an image, for a large image or the like that does not fall within the display area of the display panel 521.

Further, through the execution of the operation detection control, the main control unit 501 detects the user operation through the operation unit 540, receives operation for the icon or input of a character string in an input field of the window through the operation panel 522, or receives a scroll request of a display image through the scroll bar.

Furthermore, through the execution of the operation detection control, the main control unit 501 further has a touch panel control function of determining whether the position of operation for the operation panel 522 is a superimposed part (display area) overlapping with the display panel 521 or a peripheral part (non-display area) other than the superimposed part not overlapping with the display panel 521 and controlling the sensitive area of the operation panel 522 and the display position of the software key.

Further, the main control unit 501 can also detect gesture operation for the operation panel 522 to execute a function set in advance according to the detected gesture operation. The gesture operation does not denote conventional simple touch operation, but denotes operation for depicting a trajectory by a finger or the like, designating a plurality of positions at the same time, or combining these to depict a trajectory for at least one of the plurality of positions.

The camera unit 541 is a digital camera that uses an imaging element, such as a CMOS (Complementary Metal Oxide Semiconductor) and a CCD (Charge-Coupled Device), to perform electronic imaging and has functions similar to the image capture device 100 shown in FIG. 1 and the like.

More specifically, the camera unit 541 is configured to be able to switch the manual focus mode and the auto focus mode, and when the manual focus mode is selected, an icon button for focus or the like displayed on the operation unit 540 or the display input unit 520 can be operated to adjust the focus of the imaging lens of the camera unit 541. Then, in the manual focus mode, the live-view image with synthesized split image is displayed on the display panel 521, and the focus state in the manual focus can be checked. Note that the hybrid finder 220 shown in FIG. 8 may be provided in the smartphone 500.

Further, through the control of the main control unit 501, the camera unit 541 can convert image data obtained by imaging into compressed image data, such as, for example, JPEG (Joint Photographic coding Experts Group), to record the data in the storage unit 550 or to output the data through the external input/output unit 560 or the wireless communication unit 510. Although the camera unit 541 is mounted on the same surface as the display input unit 520 in the smartphone 500 shown in FIG. 16, the mounting position of the camera unit 541 is not limited to this. The camera unit 541 may be mounted on the back surface of the display input unit 520, or a plurality of camera units 541 may be mounted. Note that when a plurality of camera units 541 are mounted, the camera unit 541 used for imaging can be switched for individual imaging, or a plurality of camera units 541 can be used at the same time for imaging.

Further, the camera unit 541 can be used for various functions of the smartphone 500. For example, an image acquired by the camera unit 541 can be displayed on the display panel 521, or an image of the camera unit 541 can be used as one of the operation inputs of the operation panel 522. Further, when the GPS reception unit 570 detects a position, an image from the camera unit 541 can be referenced to detect the position. Furthermore, an image from the camera unit 541 can be referenced to determine the optical axis direction of the camera unit 541 of the smartphone 500 or to determine the current use environment, without using the triaxial acceleration sensor or using the triaxial acceleration sensor. Obviously, an image from the camera unit 541 can also be used in the application software.

In addition, position information acquired by the GPS reception unit 570, voice information acquired by the microphone 532 (may be text information obtained by voice text conversion by the main control unit or the like), posture information acquired by the motion sensor unit 580, or the like can be added to image data of still images or moving images to record the data in the storage unit 550, or the data can be output through the external input/output unit 560 or the wireless communication unit 510.

[Etc.]

The color filter arrays of the image capture element of the image capture device according to the present invention are not limited to the color filter arrays shown in FIG. 4A and FIG. 14. Further, the phase pixel groups (first and second pixel groups) provided on the image capture element are not limited to the arrangements shown in FIG. 4A and FIG. 14. For example, all pixels of the surface A and the surface B may be phase difference pixels (first and second pixel groups) as shown in FIGS. 4B and 4C.

Further, the split image is not limited to the image divided into two in the vertical direction. The split image may be an image divided into two in the horizontal direction or oblique direction or may be an image divided into three or more.

Figure 18:
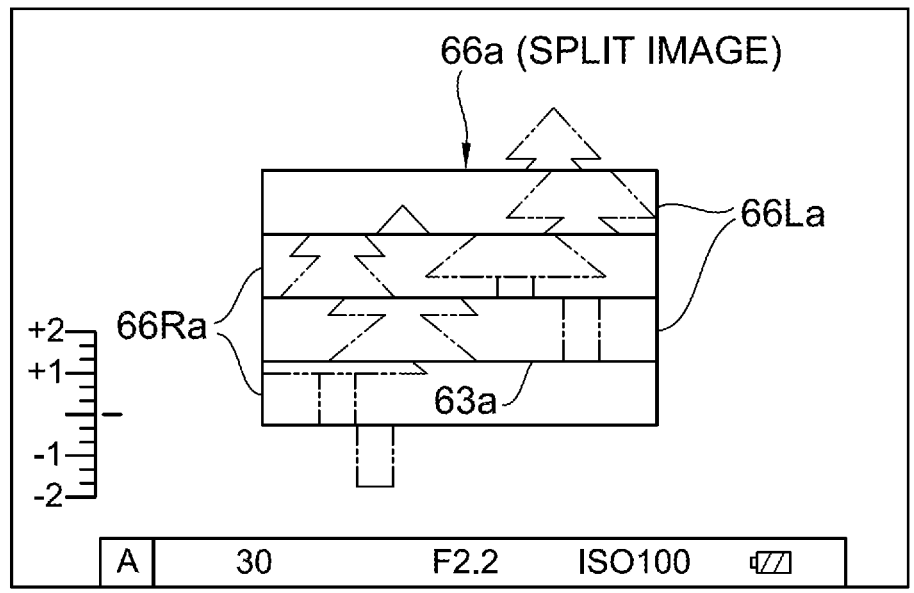
FIG. 18 is an explanatory view of a split image of another embodiment formed by dividing and alternately arranging first images and second images in odd lines and even lines.

For example, a split image 66a shown in FIG. 18 is divided into odd lines and even lines by a plurality of division lines 63a parallel to the horizontal direction. In the split image 66a, line-shaped (strip-shaped) phase difference images 66La generated based on the output signals from the first pixel group are displayed in the odd lines (can be even lines), and line-shaped (strip-shaped) phase difference images 66Ra generated based on the output signals from the second pixel group are displayed in the even lines.

Figure 19:
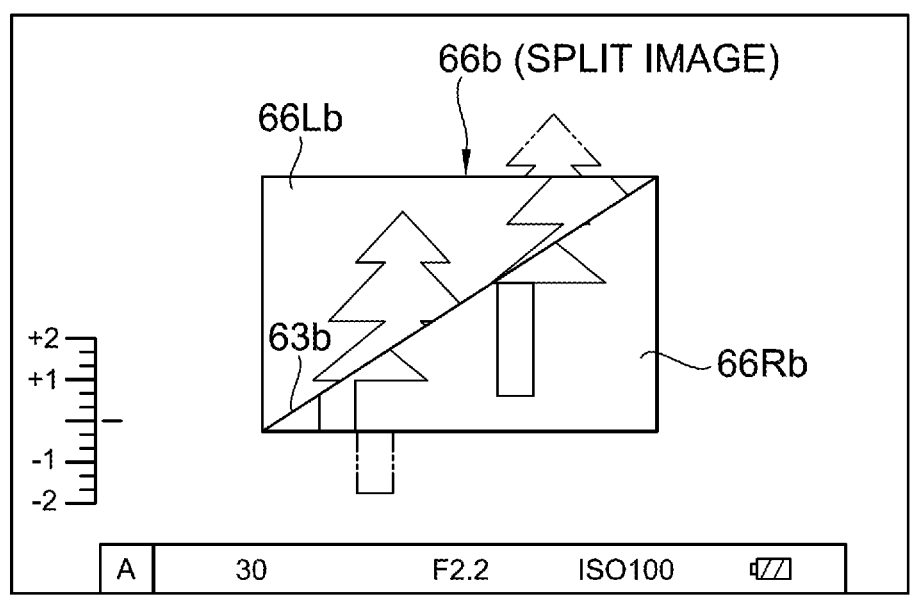
FIG. 19 is a schematic view of a split image of another embodiment divided by an oblique division line inclined relative to a horizontal direction.

Further, a split image 66b shown in FIG. 19 is divided into two by a division line 63b with an inclination angle in the horizontal direction (for example, diagonal line of the split image 66b). In the split image 66b, a phase difference image 66Lb generated based on the output signals from the first pixel group is displayed in one area, and a phase difference image 66Rb generated based on the output signals from the second pixel group is displayed in the other area.

Figure 20A:
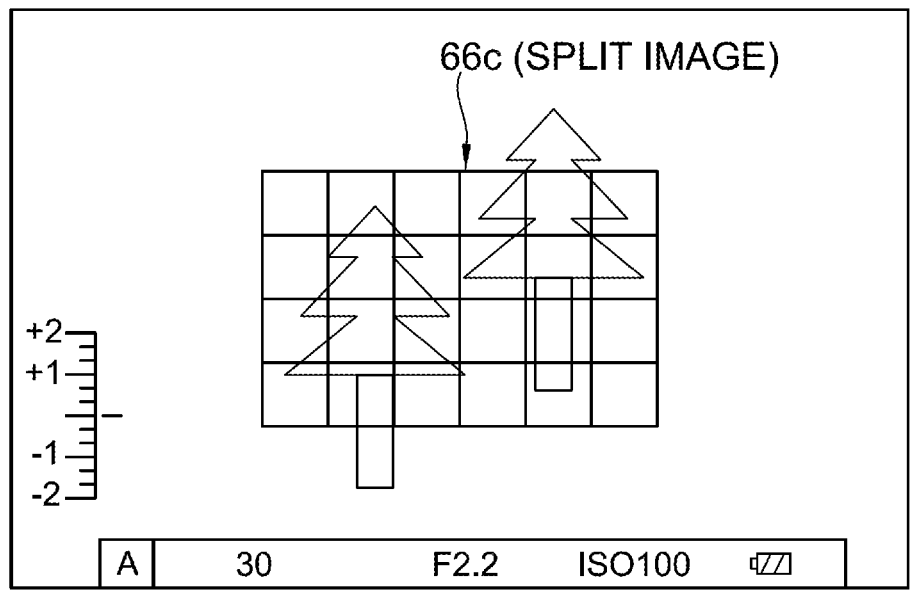
FIG. 20A is a schematic view of a split image of another embodiment formed in a check pattern.
Figure 20B:
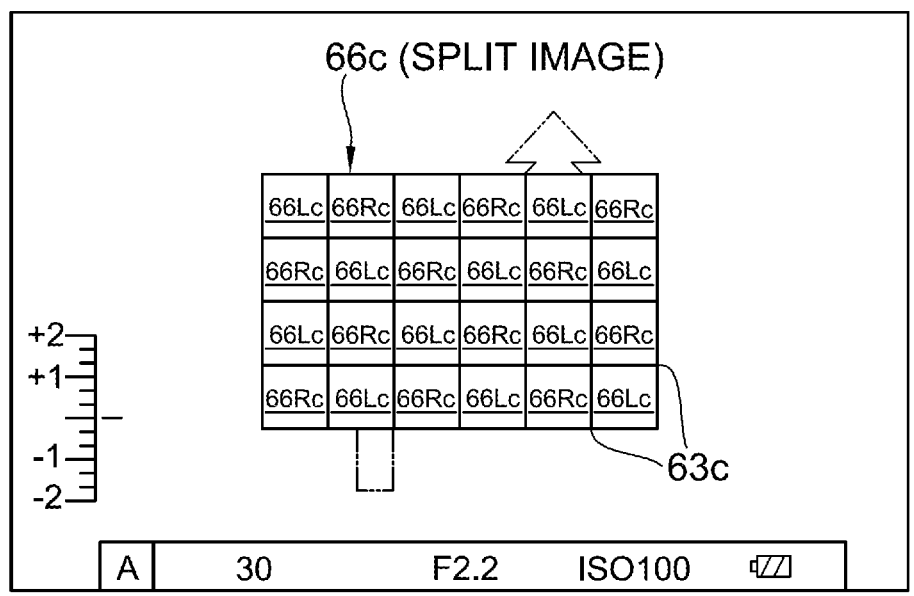
FIG. 20B is a schematic view of the split image of another embodiment formed in a check pattern.

Further, a split image 66c shown in FIGS. 20A and 20B is divided by lattice-like division lines 63c parallel to the horizontal direction and the vertical direction (see FIG. 20A). In the split image 66c, a phase difference image 66Lc generated based on the output signals from the first pixel group is arranged and displayed in a check pattern (checker pattern), and a phase difference image 66Rc generated based on the output signals from the second pixel group is arranged and displayed in a check pattern (see FIG. 20B).

Furthermore, other than the split image, another focusing confirmation image may be generated from two phase difference images, and the focusing confirmation image may be displayed. For example, two phase difference images may be superimposed, synthesized, and displayed, and a double image may be displayed when the focus is shifted. A clearly displayed image may be displayed in a focused state.

Further, it goes without saying that the present invention is not limited to the embodiments, and various modifications can be made without departing from the spirit of the present invention.

What is claimed is:

1. An image capture device comprising:
    an image capture element provided with color filters including a predetermined color filter array on pixels arranged in a matrix, the image capture element outputting a first color image with the same color array as the color array of the color filters, the image capture element including first and second pixel groups formed by pupil-dividing an object image passed through different first and second areas of an imaging lens, respectively, the image capture element including a third pixel group formed without pupil-dividing the object image, the image capture element outputting, from the first and second pixel groups, a first image and a second image with the same color array as the first color image or Bayer array, the image capture element outputting, from the third pixel group, a third image with the same color array as the first color image;
    a display unit that displays a color live-view image;
    a focusing confirmation image generation unit that generates a color focusing confirmation image based on the first image and the second image acquired from the image capture element;
    an image processing unit that generates a second color image for display to be displayed on the display unit based on the third image acquired from the image capture element;
    a display control unit that displays the color focusing confirmation image generated by the focusing confirmation image generation unit in a display area of the second color image for display generated by the image processing unit, and a phase difference detection unit that detects a phase difference between the first image and the second image output from the image capture element, wherein the display control unit uses the second color image for display generated by the image processing unit for a part in which the phase difference detected by the phase difference detection unit is smaller than a predetermined threshold in the focusing confirmation image generated by the focusing confirmation image generation unit.

2. The image capture device according to claim 1, wherein the focusing confirmation image generated by the focusing confirmation image generation unit includes divided images corresponding to the first and second images and is a split image in which the divided images are shifted according to a focus state.

3. The image capture device according to claim 1, wherein the imaging lens is an interchangeable lens that can be attached to and detached from an image capture device body or is an integrated lens fixed to the device body, and the image capture device further comprises a manual operation unit that adjusts a defocus amount of the imaging lens by manual operation.

4. The image capture device according to claim 1, wherein the image processing unit includes a generation unit that generates an image not pupil-divided corresponding to the first and second pixel groups based on the third image of the third pixel group and generates a third color image for recording made of an image of all pixels of one screen that is not pupil-divided, the image capture device further includes a recording unit that records the third color image for recording, the focusing confirmation image generation unit executes a process in parallel with a process of the image processing unit, and the display control unit synthesizes the second color image for display and the focusing confirmation image that are output at the same time from the image processing unit and the focusing confirmation image generation unit to display on the display unit.

5. The image capture device according to claim 1, wherein the predetermined threshold is H/N or k*(H/N), wherein N represents the number of horizontal pixels of the display unit, H represents the number of horizontal pixels of the image capture element, and k represents 1-neighborhood coefficient.

6. The image capture device according to claim 1, wherein in the image capture element, pixels of the first pixel group and pixels of the second pixel group are arranged in pairs adjacently to each other.

7. The image capture device according to claim 1, further comprising:
a focus mode switching unit that switches a manual focus mode and an auto focus mode; and
an automatic focus adjustment unit that adjusts a position of the imaging lens so that the defocus amount of the imaging lens becomes zero based on the phase difference detected by the phase difference detection unit when the focus mode switching unit switches the mode to the auto focus mode.

8. The image capture device according to claim 1, wherein the phase difference detection unit detects the phase difference between the first image and the second image for each pixel, and the display control unit uses a pixel of the second color image for display generated by the image processing unit for a pixel of the focusing confirmation image generated by the focusing confirmation image generation unit in which the phase difference detected by the phase difference detection unit is smaller than a predetermined threshold.

9. An image capture device comprising:
an image capture element provided with color filters including a predetermined color filter array on pixels arranged in a matrix, the image capture element outputting a first color image with the same color array as the color array of the color filters, the image capture element including first and second pixel groups formed by pupil-dividing an object image passed through different first and second areas of an imaging lens, respectively, the image capture element including a third pixel group formed without pupil-dividing the object image, the image capture element outputting, from the first and second pixel groups, a first image and a second image with the same color array as the first color image or Bayer array, the image capture element outputting, from the third pixel group, a third image with the same color array as the first color image;
a display unit that displays a color live-view image;
a focusing confirmation image generation unit that generates a color focusing confirmation image based on the first image and the second image acquired from the image capture element;
an image processing unit that generates a second color image for display to be displayed on the display unit based on the third image acquired from the image capture element;
a display control unit that displays the color focusing confirmation image generated by the focusing confirmation image generation unit in a display area of the second color image for display generated by the image processing unit,
a viewfinder used as an optical viewfinder or an electronic viewfinder;
a finder switching unit that switches an electronic viewfinder mode for using the viewfinder as an electronic viewfinder and an optical viewfinder mode for using the viewfinder as an optical viewfinder;
a synthesis unit that optically synthesizes an optical image of the optical viewfinder and the live-view image displayed by the display unit when the optical viewfinder mode is set; and
a blocking unit that blocks incidence of the optical image to the synthesis unit at the switch to the electronic viewfinder mode by the finder switching unit, wherein
the display control unit displays only the focusing confirmation image generated by the focusing confirmation image generation unit on the display unit at the switch to the optical viewfinder mode by the finder switching unit.

10. An image display method comprising:
(a) a step of acquiring a first color image from an image capture element, the image capture element provided with color filters including a predetermined color filter array on pixels arranged in a matrix, the image capture element outputting the first color image with the same color array as the color array of the color filters, the image capture element including first and second pixel groups formed by pupil-dividing an object image passed through different first and second areas of an imaging lens, respectively, the image capture element including a third pixel group formed without pupil-dividing the object image;
(b) a step of extracting first and second images corresponding to the first and second pixel groups from the acquired first color image, the first image and the second image having the same color array as the first color image or Bayer array;
(c) a focusing confirmation image generation step of generating a color focusing confirmation image based on the extracted first image and second image;
(d) an image processing step of generating a second color image for display based on a third image corresponding to the third pixel group in the acquired first color image; and
(e) a step of displaying the color focusing confirmation image generated in the focusing confirmation image generation step in a display area of the generated second color image for display,
(f) a step of detecting a phase difference between the first image and the second image output from the image capture element; and
(g) a step of displaying a live-view image in which the color focusing confirmation image is displayed on a display unit by repeatedly executing the steps (a) to (f), wherein
the second color image for display generated by the image processing step is used to display the live-view image on the display unit for a part in which the phase difference detected by the phase difference detection step is smaller than a predetermined threshold in the focusing confirmation image generated by the focusing confirmation image generation step.

11. The image display method according to claim 10, wherein
the image processing step comprises a step of generating an image not pupil-divided corresponding to the first and second pixel groups based on the third image of the third pixel group, and a step of generating a third color image for recording made of an image of all pixels of one screen that is not pupil-divided.

12. The image display method according to claim 10, wherein
the step of detecting the phase difference detects the phase difference between the first image and the second image for each pixel, and
a pixel of the second color image for display generated by the image processing step is used for a pixel of the focusing confirmation image generated by the step of generating the focusing confirmation image in which the phase difference detected by the step of detecting the phase difference is smaller than a predetermined threshold in the step of displaying the live-view image on the display unit.

* * * * *